United States Patent [19]

Laws et al.

[11] 4,452,587
[45] Jun. 5, 1984

[54] HEAT SHIELD; AND INSULATION PANELS THEREFOR

[76] Inventors: William R. Laws, 19 Tudor Ave., Worcester Park, Surrey; Geoffrey R. Reed, 8 Beechdene, Tadworth, Surrey, both of England

[21] Appl. No.: 351,321

[22] Filed: Feb. 22, 1982

Related U.S. Application Data

[63] Continuation-in-part of Ser. No. 91,752, Nov. 6, 1979, Pat. No. 4,343,168, which is a continuation-in-part of Ser. No. 902,560, May 3, 1978, abandoned.

[30] Foreign Application Priority Data

| May 4, 1977 | [GB] | United Kingdom | 18760/77 |
| Apr. 27, 1978 | [GB] | United Kingdom | 16704/78 |
| Nov. 7, 1978 | [GB] | United Kingdom | 43506/78 |

[51] Int. Cl.³ .................... F27D 3/00; B21B 27/06; E04B 5/52
[52] U.S. Cl. ................ 432/245; 72/200; 52/474; 165/135; 432/65
[58] Field of Search .......... 432/65, 245, 237; 165/135; 72/200; 52/474, 475, 775, 809, 826

[56] References Cited

U.S. PATENT DOCUMENTS

| 1,891,802 | 12/1932 | Drew | 432/65 |
| 1,959,695 | 5/1934 | Etherington et al. | 72/202 |
| 2,181,074 | 11/1939 | Scott | 52/809 |
| 3,318,064 | 5/1967 | Mayfield et al. | 52/809 |
| 3,344,648 | 10/1967 | Gray | 72/202 |
| 4,182,610 | 1/1980 | Mizuno et al. | 432/237 |

*Primary Examiner*—John J. Camby
*Attorney, Agent, or Firm*—Murray Schaffer

[57] ABSTRACT

A composite thermal insulation panel for a metal processing installation has a thin-walled casing providing a cover plate or membrane that will be heated quickly to near the temperature of an adjacent hot metal slab or strip being processed. To allow substantial freedom for movement relative to adjoining regions of the casing due to thermal expansion caused by the large temperature changes, retaining elements of the casing that locate the membrane transversely to its extent but permit relative movement in its own plane, and/or the membrane may have surfaces that slope to a central region to accommodate relative thermal expansion by flexure. Panels below the material path may have membrane surfaces that slope downwards to an escape aperture for scale dropping from the hot metal. Panels above the material path may have apertures aligning with the lower panel apertures for temperature sensors that detect the passage of hot material between the panels. Control means may be provided to displace the panels in response to the sensed transverse temperature profile to maintain the profile more uniform.

36 Claims, 38 Drawing Figures

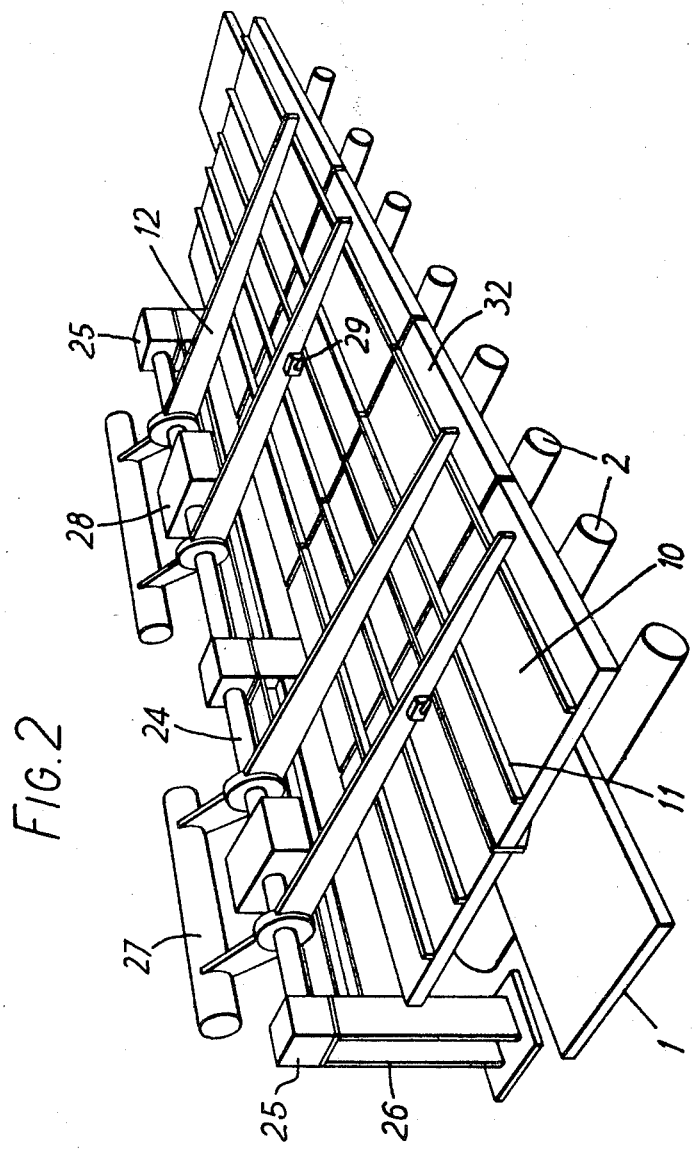

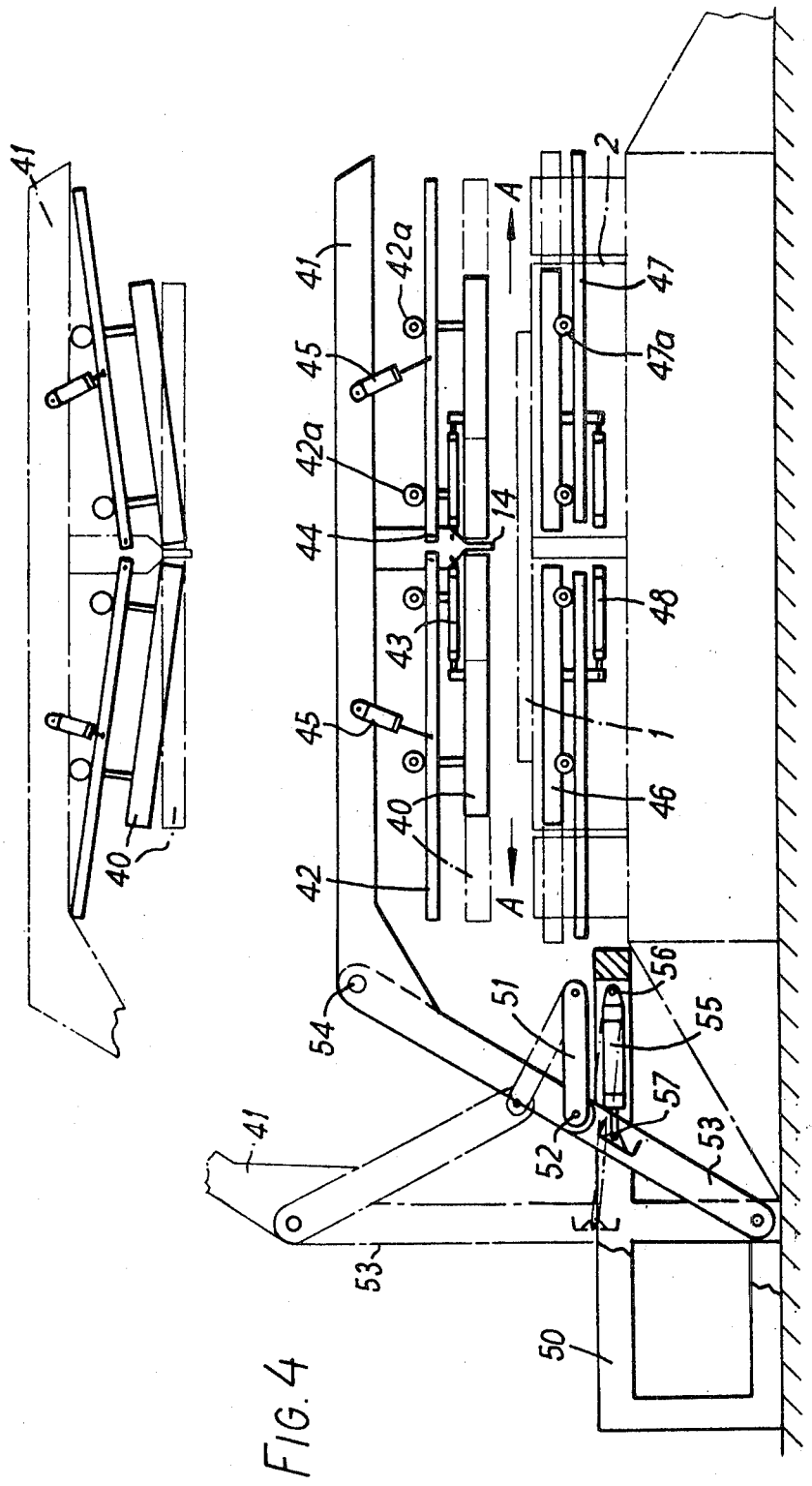

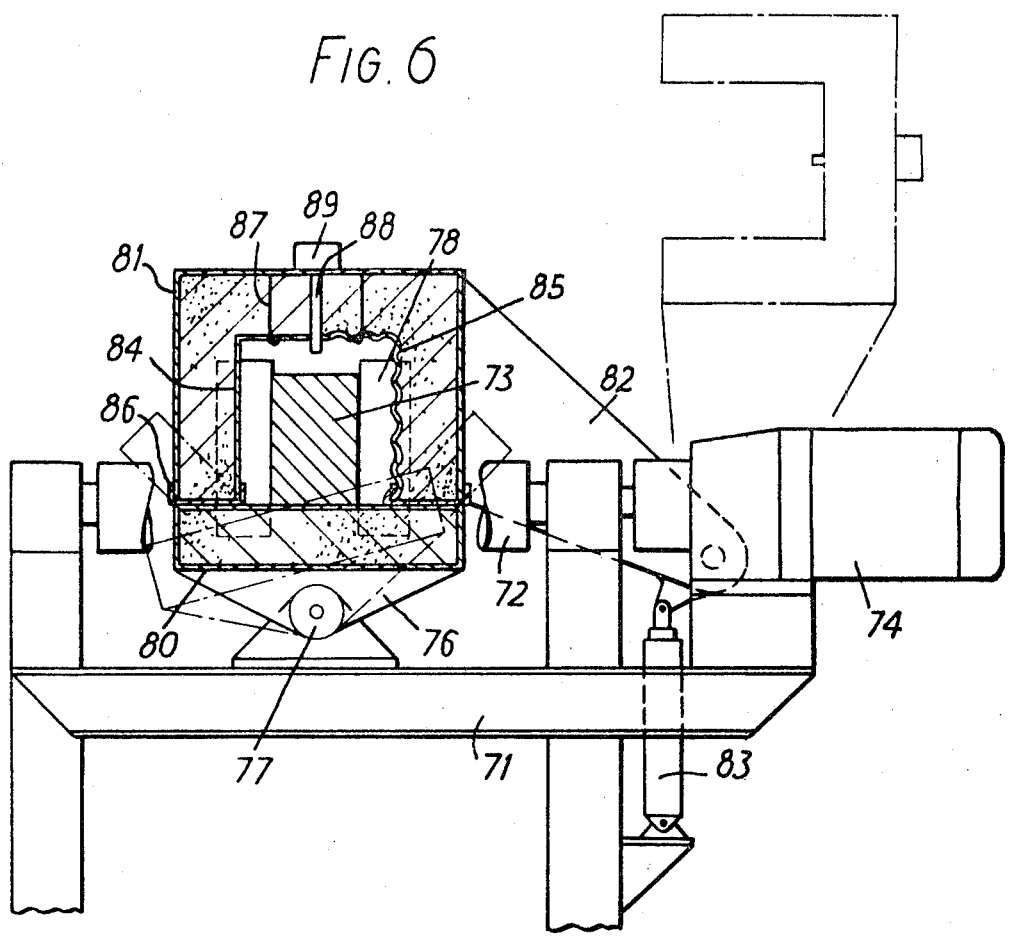
FIG. 6
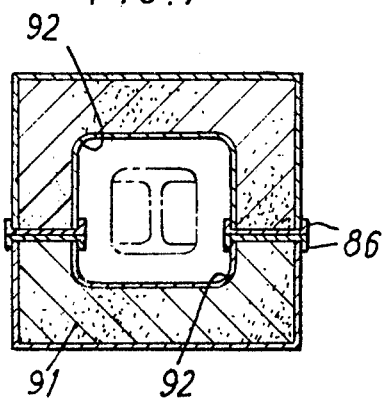
FIG. 7
FIG. 8

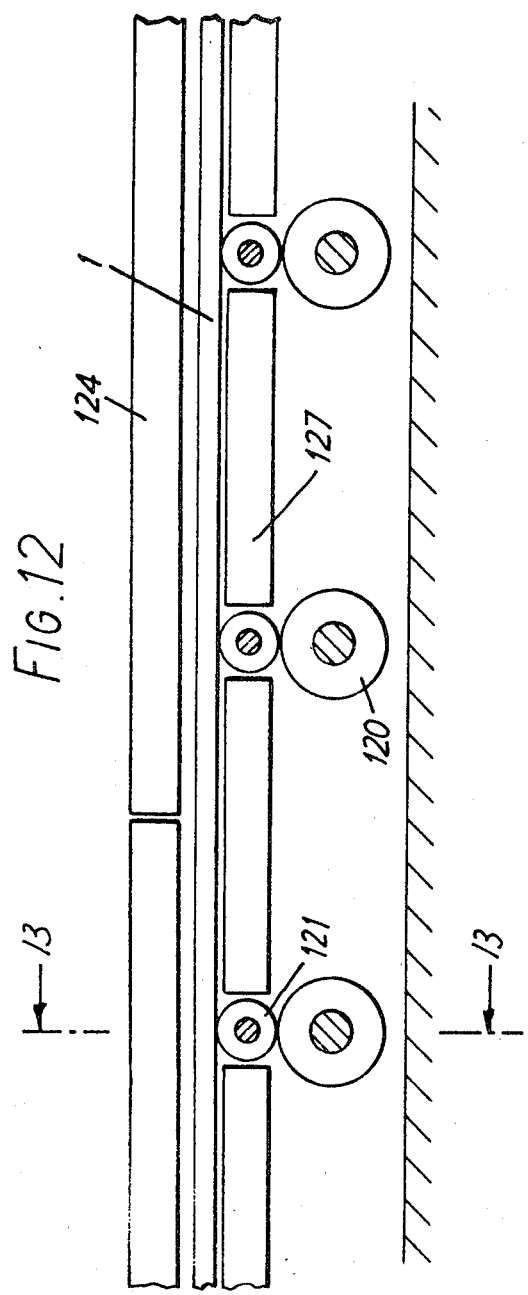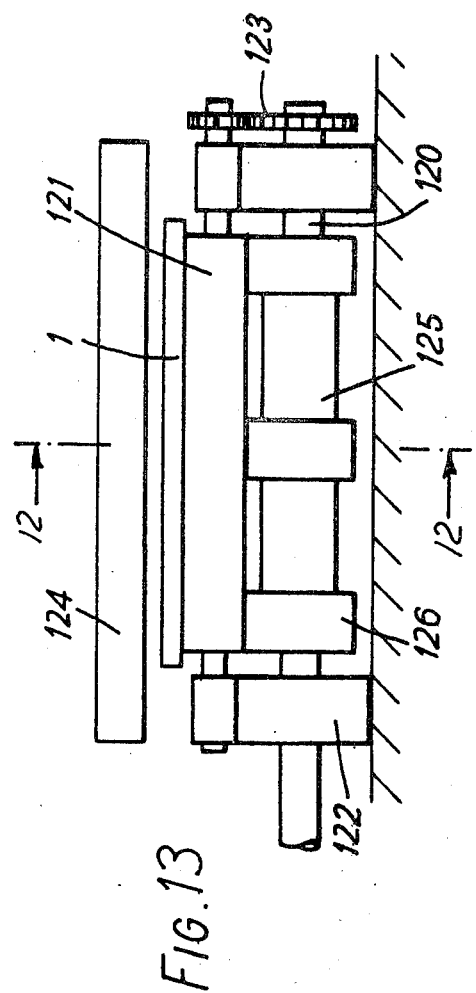

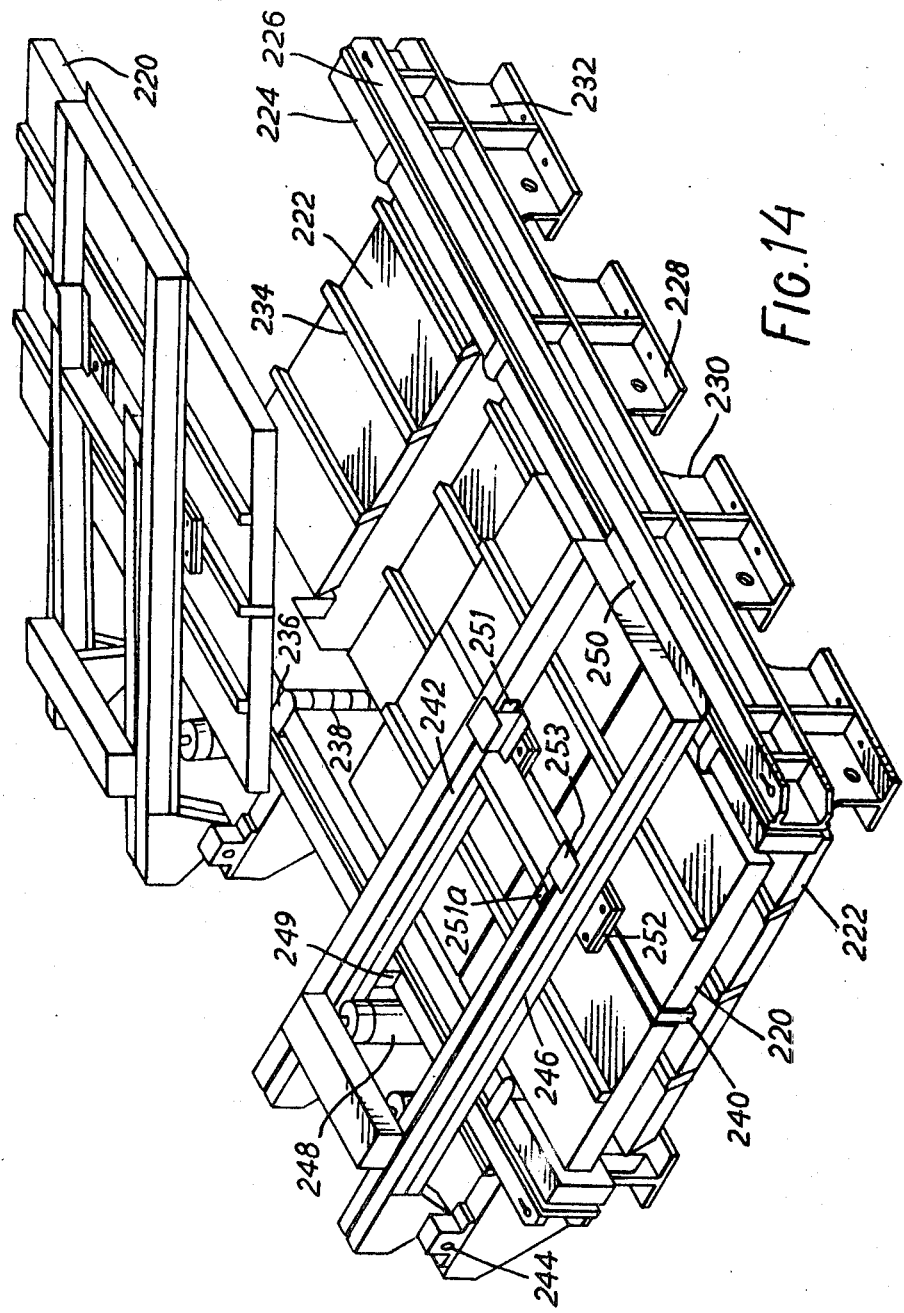

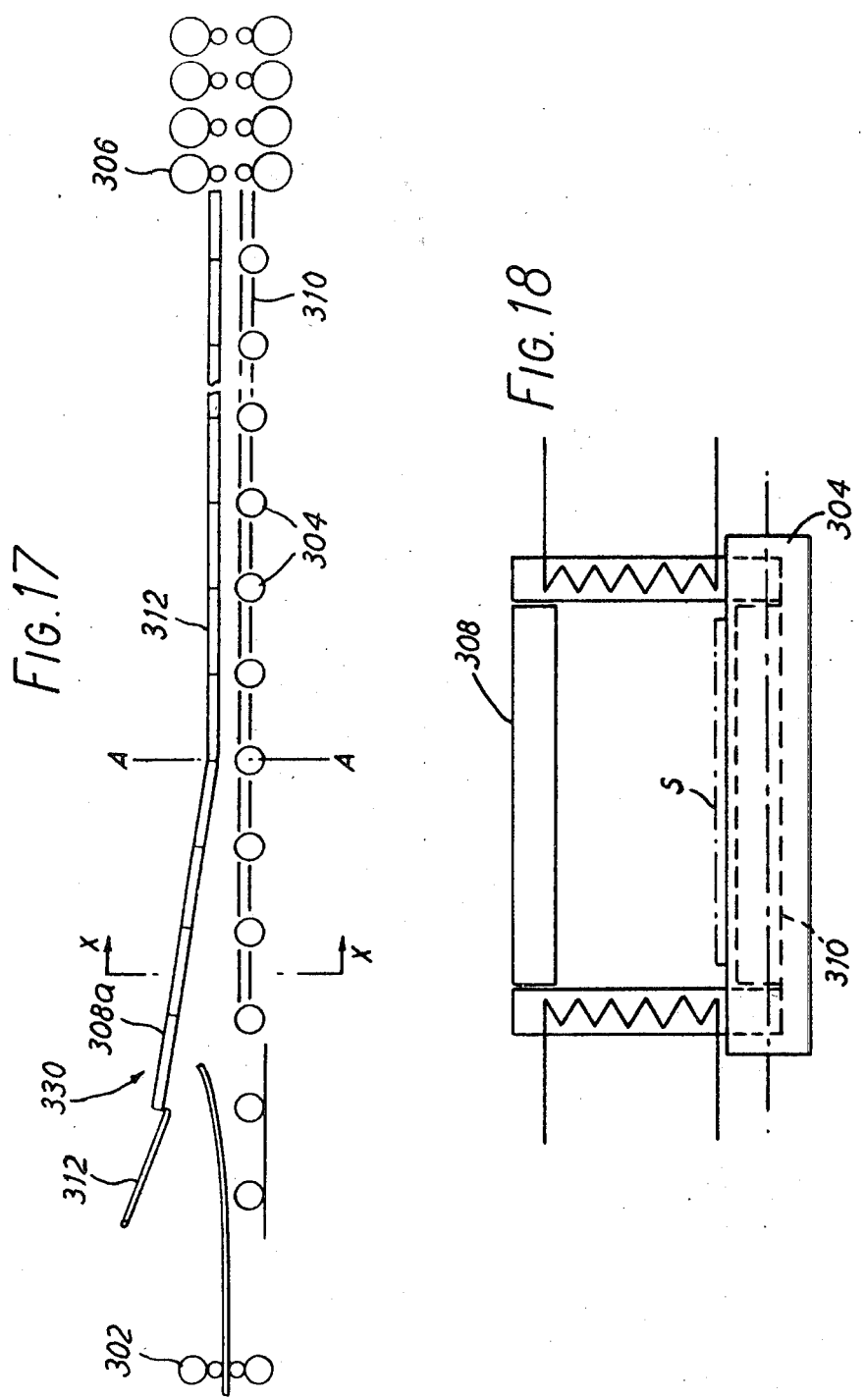

HEAT SHIELD; AND INSULATION PANELS THEREFOR

This application is a continuation-in-part of our application Ser. No. 91,752 filed Nov. 6, 1979, now U.S. Pat. No. 4,343,168, which was a continuation-in-part of our application Ser. No. 902,560 filed May 3, 1978, now abandoned.

BACKGROUND OF THE INVENTION

The invention relates to heat shielding or conserving means and to panels for such means, and it is concerned particularly, but not necessarily exclusively, with heat shielding or conserving means for use in metal processing.

In steel mill processing whether of billets, strip or sections, the metallurgical qualities of finished product are closely related to the accurate control of temperature of the material during the hot rolling process. For example, a modern hot strip mill producing steel coil is several hundred metres long and typically, steel slabs or billets may be reduced from 25 cms thickness to 0.2 cms using several roughing mill stands and five or more finishing mill stands. During the rolling, process considerable heat losses occur so that the slabs have to be heated initially well in excess of the temperature requirement at the end of the process, but a particular problem has been that the heat losses from slabs passing along the mill depend upon the time taken. If the slabs are delayed, excessive heat losses occur and the steel strip does not have its required rolling temperatures, so that it may have to be downgraded or even scrapped. In many long modern rolling mills the delay of one length of strip at the finishing end has an effect on the several lengths of material which are simultaneously at various preceding stages of rolling. Thus with more stringent quality specifications it is becoming more important to reduce the rate of heat loss from the material during transport between stands.

There is an added difficulty in this because during the final reduction stages the back end of the strip takes longer to pass through the finishing mills and so there is a temperature "run-down" along the steel strip due to the cumulative time delay along the length of the strip. The effect of temperature "run-down" is to some extent ameliorated by accelerating the finishing mills during the rolling of each individual slab or strip, but nevertheless it remains a problem.

Attempts have been made in the past to reduce the heat loss from the top surface of a hot strip during transport from the roughing mills to the finishing mills. Because radiation is a major source of heat loss at the temperatures involved (around 1060° C.) aluminium reflectors have been fixed over the path of the hot strip to reduce temperature "run-down". However maintenance problems limit the usefulness of reflectors which become inefficient as soon as they become dirty, and in addition, the aluminium reflectors which have been used for their high reflectivity and relatively low cost can reach their melting temperature if their reflectivity decreases.

It has been proposed (UK Pat. No. 1 040 420) to use, as heat shields above the hot strip in a hot-rolling mill, heat reflecting panels made up of two similarly corrugated thin plates, the plates being arranged one over the other with the corrugations at right angles. Thermal insulation material is put on the upper face of each plate to reduce heat losses. This proposal offers a theoretical advantage in that it provides a re-radiating surface that heats up quickly to a luminous temperature close to that of the hot strip and so inhibits radiation from the strip, but the use of such panels raises practical problems.

To give the required structural stiffness to two thin plates with transverse series of corrugations, the plates must be secured together at the points of contact of their mutually transverse corrugations. Unless they are attached thus they cannot provide a stable planar structure. In principle, the individual corrugations are then still able to flex to accommodate relative expansion effects when the panel is heated, but under the very severe conditions encountered in steel rolling mills, particularly because of the need to have very rapid heating of the panels over a very large temperature range if they are to perform their function, the mechanical strains and the high maximum temperatures impose stresses on the point attachments that very quickly lead to fracture and to separation of the plates. The use of thermal insulation over each corrugated plate as proposed by UK Pat. No. 1 040 420 makes the problem worse as this increases the temperature differentials between the upper and lower plates and therefore adds to the mechanical strain upon the point attachments.

The very large and rapid temperature variations in operation and the resulting considerable thermal expansion movements can also quickly affect the thermal insulation material, having regard to the fact that its expansion co-efficient will be very different from that of the metal plates. This can result in displacement of the material that gives a non-uniform insulating effect adversely affecting the efficiency of operation, and it can also considerably reduce the operational life of a panel as the substantial relative thermal movements are likely to cause mechanical damage to the insulation.

Another source of non-uniform heating effects arises from the fact that, in order to reduce costs, the individual panels of an installation should be made as large as possible, but the extended use of such panels in severe conditions, in particular when large thermal gradients are experienced, can result in difficulties. These gradients may occur as a hot billet or slab is introduced, or because only part of the transverse extent of the panels is covered when rolling narrower strip. For example, in large panels (e.g. exceeding 400 mm by 400 mmin plan area) expansion of the plate forming the hot face of the panel can be so great that gross buckling can occur, and the plate may be cracked by the repeated stresses as the panel is subjected to successive thermal cycles from about 300° C. to 1050° with the movement of each hot slab past it.

If panels are also provided to shield the underside of the material path through the rolling mill, these may be subject to an additional difficulty due to the build up of foreign matter on them. When steel products are reheated, e.g. to temperatures up to 1250° C., scaling of the slabs or billets will occur (i.e. oxidation of the surface to form loosely attaching scale). For many products, scaling is acceptable and is even desirable because it removes minor surface defects and results in a better finished product, but there is a problem in disposing of the scale if heat shielding panels are arranged below the material path. Typically, furnace oxidation can result in the formation of scale to the extent of some $1\frac{1}{2}\%$ of the product itself and most of this scale will fall from the product during rolling.

The deposition of scale at this rate on panels below the material can quickly result in a build-up or deposit which effectively acts as a thicker wall than the casing plate forming the hot face of the panel. This effect is undesirable because it alters the thermal characteristics and physical properties of the panels, which will have been designed to suit each particular installation. It is desirable therefore to avoid any significant accumulation of scale on the panel. A measure of the problem is that in a mill rolling about 400 tonnes of steel per hour, up to 2 tonnes of scale per hour can be deposited over a 60 meter long installation.

SUMMARY OF THE INVENTION

According to one aspect of the present invention, there is provided a composite thermal insulation panel for use in a steel rolling mill, comprising a face backed by thermal insulation means and adapted to be heated by adjacent hot material in the mill to a temperature close to that of the material to radiate heat back to the material, the panel comprising a protective outer casing which contains at least one fibrous ceramic heat-insulating layer a thin-walled cover plate or membrane forming or overlying a main face of the casing being arranged to provide a hot face confronting the hot material and being capable of relative thermal expansion with respect to adjacent regions of the casing. By making the cover plate relatively thin it can have a low thermal capacity, and at least a part of its area may be provided with dimples, corrugations or other locally contoured formations to increase the heat emissivity of its surface and to contribute to the strength of the cover plate and its ability to withstand thermal stresses, as well as to allow a measure of independent thermal expansion by flexure.

The casing may comprise a peripheral housing that supports the cover plate in a manner that permits its relative thermal expansion, and the opposite main face of the panel forming its cold face may similarly be provided with a cover plate mounted in a manner permitting relative thermal expansion, so that thermal stresses on the casing are kept to a minimum.

Preferably, the casing provides a substantially dust-tight enclosure for the insulating core. Venting apertures may be arranged in the casing for the escape of air and steam from within, the apertures being provided with valves for preventing or limiting a return flow through them.

According to another aspect of the present invention, there is provided a composite thermal insulation panel comprising a core of heat-insulating material enclosed in an outer casing comprising a thin wall providing a membrane adapted to be exposed to thermal radiation from adjacent high temperature material and to form a hot face of the panel with a temperature close to that of said material, said membrane having edges retained between opposed elements of the panel casing at the sides thereof, said elements being arranged at a spacing substantially larger than the thickness of the membrane and the membrane edges being held so as to be able to move inwardly and outwardly substantially freely relative to said elements while remaining engaged therebetween.

In this manner, the membrane can be held to occupy a generally predetermined position transversely without having to rely upon the mechanical or dimensional stability of the heat-insulating material. The membrane is nevertheless able to move to accommodate thermal expansion even though it may be substantially deformed in prolonged use because of internal stresses set up by effects of temperature gradients and other non-uniform influences.

As another manner of limiting stresses arising from the considerable thermal expansion of the hot face of a composite thermal insulation panel, according to another aspect of the invention in the casing of such a panel, in which the hot face is formed by a thin wall providing a membrane that attains a temperature close to that of adjacent high temperature material upon exposure to thermal radiation from that material, said membrane comprises surfaces that are inclined from at least two opposite edges to an inner region which is thereby at a different level from said edges.

By so inclining the surfaces of the membrane, it is able to flex relatively freely as it expands with respect to the adjacent parts of the casing, and thermal expansion cycles of the hot face can be accommodated without the bending stresses producing buckling that could weaken the panel or lead to a permanent distortion that alters its characteristics.

Preferably, in the case of panels arranged to be mounted above or below the material being processed, said surfaces of the hot face are inclined downwardly to the inner region of the panels when so mounted.

The arrangement of such inclined surfaces in the membrane may be provided in conjunction with the arrangement of the membrane edges to be movable substantially freely, as aforesaid, relative to retaining elements at the sides of the panel casing. However, in order to allow panels to be mounted as close as possible to the high temperature source while avoiding direct contact between them and the source, their hot faces are preferably so arranged and supported that thermal expansion results in deformation laterally of the panel rather than transversely to its extent.

According to a further aspect of the invention, there is provided a composite thermal insulation panel or a group of panels disposed side by side, the or each said panel having a core of heat-insulating material enclosed in an outer casing comprising a thin wall providing a membrane adapted to be exposed to thermal radiation from adjacent high temperature material and to form a hot face of the panel with a temperature close to that of said material, said membrane of the panel or said membranes of the group of panels comprising surfaces that are inclined downwardly to at least one through opening within the overall planar extent of the panel or group of panels.

In this arrangement, the inclined hot face surfaces may be adapted to facilitate relative movements of the hot face membrane as already described. Whether or not this is required, however, the arrangement offers other advantages.

Said through opening may provide a sight path for temperature sensing means and/or, in the case of a panel or panels below the high temperature source, a passage for the removal of scale. Thus in the lower panel or panels below a hot steel slab or strip, with appropriate inclination of the hot faces a deposit of scale or other foreign matter will be able to slide under its own weight through said opening so that it is not allowed to build up on the panel hot face. Such lower panels may be flexibly mounted to facilitate scale removal through said opening, they then being vibrated either by the normal roller table vibrations or by a separate vibrating motor arrangement.

Preferably, in a panel according to the invention the heat-insulating core, at least in the region immediately underlying said hot face membrane, comprises a pre-compressed fibre blanket to act resiliently as a spring to ensure contact with the hot membrane as it expands and contracts through its duty cycle.

When employing insulation panels to form a shield along the path of the hot material in a rolling mill, it is desirable to arrange that such panels are capable of being positioned as close to the material as possible in normal operation, so that they exercise a more uniform effect across its width.

The reduction of the gap between the strip and the panels, is limited, however, by the need to allow for introduction of the strip past the panels and then to allow for deflections and transient displacements of the strip transverse to its travel direction. Thin-walled panels are particularly susceptible to damage if struck by the metal strip or billet as it moves along its travel path. This damage is particularly likely to occur to the panels above the material, because the roll table itself offers some protection for the lower panels.

Particular problems can arise because, although during rolling the main extent of a slab or strip will usually be relatively flat, its ends can be turned-up (i.e. curved upwards or downwards) to a certain degree because of the forces applied to each end portion as it passes unsupported through a set of rolls, and the effective height of the material may be increased thereby to many times the material thickness. This effect is particularly marked when a strip is rolled in a semi-continuous mill having reversing roughing roll stands through which the initial slab is passed forwards and backwards repeatedly to reduce its thickness, but in a continuous mill the leading end of the strip will also be deformed in a similar way.

According to another aspect of the invention, there is provided a heat shield arrangement with heat-insulating panels arranged adjacent to a travel path at least an intermediate region longitudinally of said path where upper and lower series of panels are disposed with a limited vertical spacing between them to form a travel path of restricted height, and wherein at an entry region of the arrangement an increased height passage is provided for the introduction of a turned-up strip material, said entry passage decreasing in height to lead into the limited vertical spacing of said intermediate region.

This measure can be employed with particular advantage in combination with upper-panel displacement means operable in dependence on the force of the lifted material, since the entry region may offer sufficient resistance to reduce the turn-up of the leading end of the material and so help to minimise the vertical spacing between the upper and lower insulating panel in the intermediate part of the heat shield arrangement. The employment of an increased height entry section is, however, also of value if the aforesaid displacement means are not provided.

It is possible for the entry region, especially if relatively short, to comprise a relatively robust bar or frame structure with little heat-insulating effect if any, but it will be preferred, particularly if it is required to provide a relatively large maximum height entry, that at least a part of the entry region is composed of upper and lower heat-insulating panels the vertical distance between which panels is progressively reduced along the length of the material path towards said intermediate region.

In an arrangement in which the main or intermediate path of the channel path has a relatively uniform insulating effect due to the closeness of the upper and lower panels, the benefit of this may be partly lost where the panels must be more widely spaced apart, for example at an increased height entry region. In such cases, to obtain the desired degree of uniformity of heat insulation it may be preferred to provide panels at the sides of the strip travel path, with heating elements disposed on or within at least some of said side panels. In this way it is possible to counteract the greater heat loss from the edges of the material due to the aditional surface area, and especially at the ends of the heat shield arrangement where in addition to any increased spacing of the upper and lower panels, the panels may themselves not be close to the heated material temperature.

In any event, the panels are preferably so arranged that they provide an enclosure that substantially completely surrounds the material path. Alternatively, it may be sufficient to arrange that there is substantially no straight-line path for heat radiation from the strip past the panels transverse to the travel path of the strip.

In the arrangement disclosed in UK Pat. No. 1040420, the heat-insulating panels are disposed in series over a rolling mill delay table, so as to reduce the loss of heat from hot sheet material on the table, and a pyrometer immediately in front of each panel is able to actuate displacement of its panel transversely away from the table. Thus, when the strip advances onto the delay table each insulating panel will be moved to its operative position over the strip if the pyrometer senses a strip temperature signficantly less than a preset value, and if the temperature rises above the preset value the panels are displaced laterally clear of the table and the strip.

This arrangement, however, is only of limited value because it relies upon the temperature of the strip being sufficiently uniform over the region of each panel for the effective control of the panel temperature to be obtained by the positioning of the heat-insulating panel in one of its two alternative positions. There can in fact be significant local temperature gradients, and it has been found that there may in particular be significant temperature differences accrross the width of a sheet of hot material—so that there is likely to be a substantially higher rate of cooling of the outer lateral margins of the sheet as compared with its central region.

According to a still further aspect of the present invention, a heat shield arrangement is provided comprising a series of heat-insulating panels mounted above a path for the hot material, the panels each having a heat-insulating core and a cover plate forming or overlying a main face of each panel being adapted to act as a hot face presented to the material being processed and to radiate heat back to the material, characterised in that the panels of the series are arranged in groups of two or more panels disposed side-by-side across the lateral extent of the path of the material, and means are connected to said plurality of panels for displacing the panels with respect to each other for varying their heat-insulating effect on a central region of the hot material relative to the lateral margins thereof, at least one array of temperature sensors being laterally spaced across the material path, and control means actuated by said sensors being connected to said displacement means inorder to control the temperature and/or the transverse temperature profile of the material being processed in accordance with predetermined values.

Said displacement of the panels may take place by movement of the laterally opposed panels towards and away from each other, maintaining their height above the material path, or it can involve tilting of the panels so that they are raised relative to the central region of the material path and therefore have a lesser effect there, but preferably the displacement means are adapted to provide both these motions alone or in combination.

Where the heat shield arrangement also has heat-insulating panels disposed below the material path, these may also be arranged to be displaceable for varying the heat-insulating effect across the width of the material, e.g. by providing means for moving them laterally towards and away from each other.

On a conventional strip mill delay table, the sheet material path is defined by a series of rollers on which the material is supported. According to a preferred feature of the invention, said rollers comprise upper smaller diameter rollers upon which the material rests, and lower larger diameter rollers that support the upper rollers. In this way, it is possible to increase the proportion of the lower face of the material path that is shielded by the lower series of heat-insulating panels, since these panels can overlap the larger rollers to extend close to the upper, smaller diameter rollers.

There is a further advantage arising from the use of the smaller diameter upper rollers in that the heat transfer by conduction through these will be less than for the larger diameter rollers of a conventional rolling mill table. This loss can be still further reduced by limiting the contact area between the upper and lower rollers, in particular by arranging that the upper rollers are only in contact with a plurality of axially spaced larger diameter portions formed on the lower rollers.

Preferably, the upper series of panels are mounted on support means provided with a raising mechanism which allows them to be raised to gain access to the conveying path, and the raising mechanism may be arranged to operate automatically to protect the panels should there by a malfunction that causes the material being processed to lift and strike the panels.

The control of the temperature of material being processed by varying the heat shielding effect transversely across the material is not appropriate in some instances, for example in processing narrow cross-section materials such as bars and rolled sections. In these instances, according to another aspect of the invention, there is provided a heat shield arrangement comprising heat-insulating panels disposed along a path of the material being processed, the panels each having a heat-insulating core and a cover plate forming or overlying the face of each panel being adapted to act as a hot face presented to the material being processed and to radiate heat back to the panel, characterised in that the panels form a tubular enclosure to surround all sides of the material path with the upper and lower regions of said conduit being provided by respective upper and lower panels, and at least some of the panels being mounted on displaceable support means to open the tubular enclosure.

Conveniently, contact means for the material being processed are provided for operation of the displacement means of the displaceably mounted panels in order to lift said panels away to avoid damage by material that is distorted or that has lifted, as already discussed.

BRIEF DESCRIPTION OF THE DRAWINGS

The invention will be more particularly described by way of example, with reference to the accompanying drawings, wherein:

FIG. 2 is a perspective view of a part of a transfer conveyor of the mill showing only the upper panels in place, FIG. 4 is a transverse cross-section of a heat shield arrangement, analogous in many respects to the embodiment of the invention shown in FIG. 2, but incorporating adjustment means for the panels, FIG. 6 is a transverse cross-section of a further arrangement of heat shield panels according to the invention, FIGS. 7 and 8 are schematic illustrations of alternative heat-insulating panels for the arrangement of FIG. 6, FIGS. 9 and 10 illustrate details of a modified cover plate construction for a panel according to the invention, FIG. 14 is an isometric view of another heat shield arrangement having automatic upper panel displacement means, FIG. 17 is a schematic side view of a further heat shield arrangement according to the invention between successive roll stands in a semi-continuous rolling mill, FIG. 18 is a sectional view on the line X—X in FIG. 17.

DESCRIPTION OF THE PREFERRED EMBODIMENTS

Figure 1:
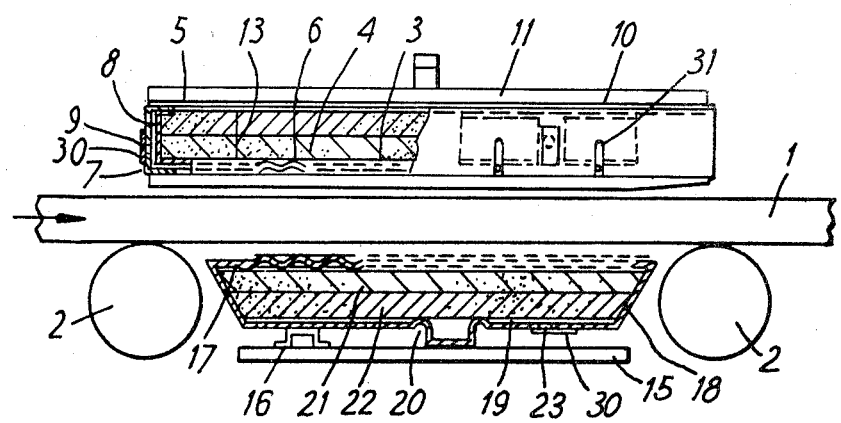
FIG. 1 is a longitudinal vertical section of a portion of the strip conveying path in a hot strip rolling mill showing upper and lower panels according to the invention used in a heat shield arrangement.

Referring to FIG. 1 of the drawings, a hot strip mill delay table is shown with a hot steel slab or strip 1 resting on rollers 2 and with low thermal mass insulating panels according to the invention disposed above and below the strip.

The upper panel comprises a casing containing a two-layer core of heat-insulating material consisting of high temperature ceramic fibre board insulation 4 adjoining a bottom cover plate 3 forming the hot face of the panel, the insulation 4 being backed by lower temperature insulating board 5. The cover plate 3 is formed by a thin sheet or membrane of temperature resistant material, e.g. stainless steel, which material can be made either heat reflecting or adsorbing. The cover plate rests upon heat-resistant angle-section frame 7 of the casing, which allows free thermal expansion of the plate, and slots 31 in the frame also allow its relative thermal expansion. The top of the panel is sealed by a top plate 10 to which is fixed a mounting lug 11.

In use, as the hot strip 1 enters under the panel heat radiated from the strip will impinge on the cover plate. Initially the front end of the strip will cool at almost the rate it would achieve in free air while the cover plate is cool. If the plate is thin—for example, less than 1/50th of the thickness of the hot strip 1—then its temperature will quickly rise to closely approach the strip temperature without a significant drop in strip temperature, and as heat loss into the panel is minimised by the thermally insulating core and the panel almost immediately begins to re-radiate heat and approach thermal equilibrium with the strip.

The total effective emissivity of the cover plate of the re-radiating panel is increased by substantial corrugating or dimpling or like local contouring 6 of its surface, and since the cover plate is preferably very thin such contouring can serve to strengthen the plate and allow local flexing to facilitate relaxation of thermal stresses set up by rapid heating and cooling of the plate.

The cover plate is held from above against the horizontal flanges of the frame 7 by leaf springs 8 to help provide a seal between the plate and the frame and so minimise the intrusion of dirt and steam into the ceramic fibre core. Vents 9 can also be provided in the side walls of the mounting frame 7 to facilitate the escape of steam if, as during periods of inactivity, water is adsorbed by the core and is subsequently vaporised by the heating that occurs when the panel begins to be used again.

One-way flap valves 30 on the vents 9 help to prevent the ingress of steam from the surroundings. It should be noted that if the cover plate is very thin, extra retaining clips 13 may be required to hold it against the ceramic fibre material of the core.

It will be clear that almost half the heat radiated by the strip is from its lower surface. The problems presented in placing a panel under the strip are greater than for the top panel and in general a modified construction will be required. The lower panel shown in FIG. 1 is supported on the table base plate 15 and can rest thereon either directly or through brackets 16. The cover plate 17 forming the hot face of the lower panel has local contouring like the plate 3 but forms an integral part of an outer casing of welded construction with stainless steel side walls 18 and base 19 as below the strip greater protection is needed against the ingress of foreign matter. The contouring is preferably in the form of a series of parallel corrugations arranged particularly to accommodate thermal expansion of the hot face relative to the remainder of the panel, but because the cover plate is restrained at its edges, the casing is made relatively narrow in the direction of the corrugations, e.g. some half the length transverse thereto. The corrugations also increase the effective emissivity of the hot face, as mentioned above, and strengthen the relatively thin material.

The base of the casing has one or more corrugations 20 to allow differential thermal expansion and the panel is filled with a core of higher and lower temperature insulating ceramic fibre panels 21, 22 respectively, similar to the upper panel core. Small steam vents 23 are provided in the base of the panel to allow venting of trapped water and these are normally closed by one-way flap valves 30.

A number of lower panels are disposed side-by-side across the width of the strip and not only reduce the heat loss from the bottom of the strip, but by extending close to the opposed sides of successive rollers of the delay table they also reduce the thermal load on the rollers thereby improving their operating life and reducing the amount of water cooling required.

Figure 3:
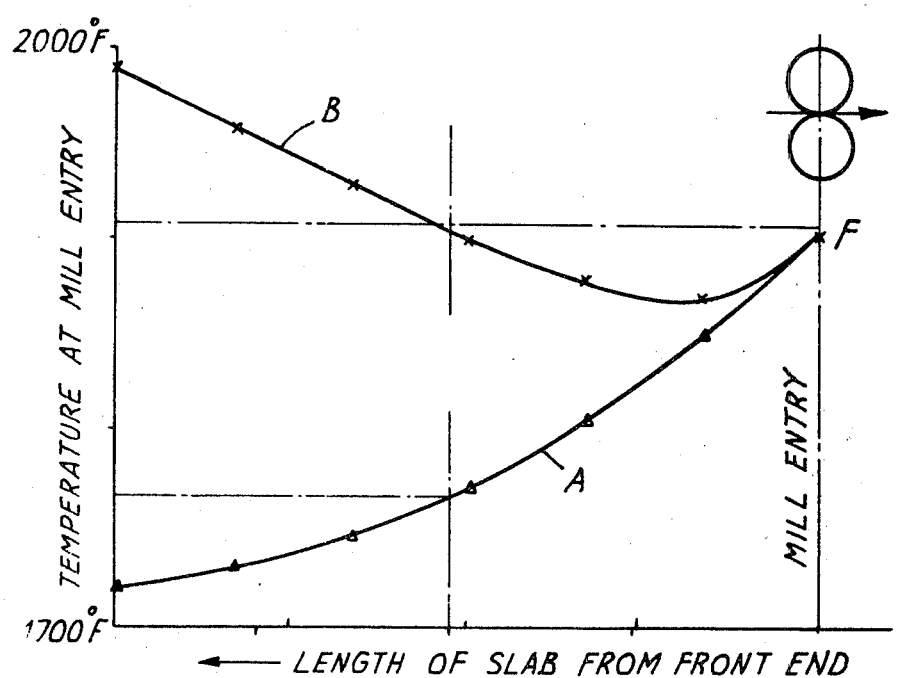
FIG. 3 is a graph illustrating temperature run-down of a slab in a hot strip mill and the influence on this of a heat shield arrangement.

The effect of a series of such upper and lower panels as a heat shield in a rolling mill can best be understood by reference to FIG. 3, which shows the temperature of a strip or slab at entry to the roll train of a mill after it has passed along a delay table. Curve A shows how the temperature of the strip, as sensed at the mill entry, runs down because of the increasing heat losses that have occurred at points progressively further back along the length of the strip due to the increasing delay before entry as dictated by the travel speed of the strip in the rolls. The initial temperature of the strip would be say 2012° F. and while the front end temperature loss might be some 100° F. at mill entry (point F), further back along the strip the material arrives at the mill with a progressively lower temperature. Curve B shows how the heat shield arrangement of panels according to the invention gives a similar temperature fall at the front end of the strip, while the panels are still cool, but they almost immediately radiate heat to reduce the temperature fall and very quickly approach the initial temperature of the strip and can reverse the temperature profile for the rear end of the strip, so as to give a more uniform temperature at roll entry.

In a sufficiently long run, the rear end temperature of strip can of course approach the initial strip temperature, but in general the form of the temperature distribution at points along the strip length at their entry to the mill can be controlled by choice of the storage and conductivity characteristics of the hot faces of the panels and the heat insulating cores. It is even possible to incorporate heating means in the panels adjacent their hot faces to give a more uniform exit temperature, but usually this would only be required for material having a relatively low thermal mass, such as bars and sections.

As already stated, the cover plates can be heat-reflecting but in general it will be found convenient to make them black to suit the dirty environmental conditions and in this case they can operate better to improve the temperature distribution in the common condition of a strip with a higher temperature leading end in the manner shown in FIG. 3, or similarly where there is some time lag in the passage of the trailing end to a roll stand.

The mounting of the lower panels presents no problems but the top panels require to be mounted so that they can be readily lifted from over the hot strip, e.g. for maintenance or to allow the removal of the strip in the event of a long stoppage or to prevent damage to the panel if there is a buckled or bent strip. FIG. 2 illustrates a mounting means suitable for strip mill applications in which upper panels 32 are suspended over the tables in pairs by their top plates 10 and mounting lugs 11 from booms 12, although for narrow mills one panel width will be sufficient to span the roller table whereas on wide mills as many as four panels side-by-side may be required. The panels are arranged in a row or rows extending along the strip-conveying direction to make up the required heat shield area. It will be understood that the smaller width of the lower panels dictated by thermal expansion considerations in this particular use will result in the provision of a larger number of panels than the upper panels to cover the same width.

The booms 12 are mounted as cantilevers from shafts 24 on external floor-mounted frames at one side of the mill the shafts being supported in rotary bearing blocks 25 to be able to pivot the booms through substantially 90° between the horizontal position shown and a raised vertical or near vertical position. Columns 26 carrying the bearing blocks are positioned so as to provide access to the roller drive motors (not shown) of the mill. The panels and booms are counterbalanced on the shafts by weights 27 and the movement of the panels is obtained by motors 28, e.g. hydraulically operated, which are designed to give positive drive both when raising and lowering the panels.

Operator controls (not shown) are provided for the motors 28 to allow the panels to be raised and lowered for maintenance or access to the mill. To prevent damage to the panels during operation, e.g. if there is a bent or buckled strip in the mill, a skid bumper bar or fender bar 14 is fitted to certain of the panels or to the boom structure so that the bent strip will contact the bar to push the panels upwards. Preferably, the skid bumper bars are connected to pressure switches 29 which activate the raising movement of the motors 28 in such an eventuality, so that the panels are lifted independently of the force on them.

Figure 5:
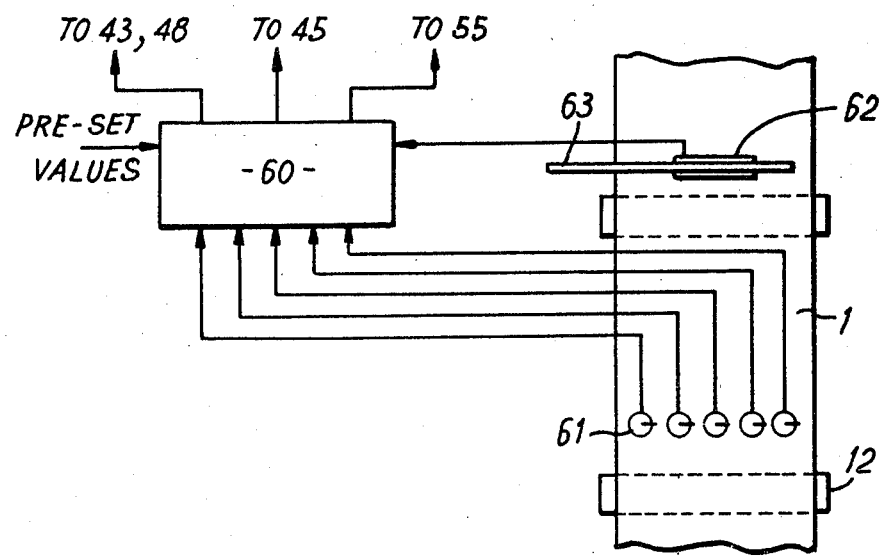
FIG. 5 is a schematic illustration of the control means for the arrangement of FIG. 4.

In FIGS. 4 and 5 there is shown a further development of the invention in the example of steel strip rolling mill similar in many respects to that shown in FIG. 2, but in which the heat shield panels can be adjusted in position to achieve a more uniform temperature distribution in the hot material.

Upper panels 40 are mounted on cantilever arms 41 over the conveyor for the steel strip 1, so that as in FIG. 2 the panels are able to cover the entire upper face of the strip. In this embodiment not only are the cantilever arm supports of the panels displaceable to move the panels towards and away from the strip, but the panels themselves are displaceable on the arms to regulate their effect on the strip.

For this purpose the panels may be conveniently arranged in pairs with the central bumper bar 14 independently mounted between them. The panels are supported by transverse rails 42 that are secured below the cantilever arms and are suspended from rollers 42a running on the rails so that they can be displaced laterally towards and away from each other by rams 43, as indicated by the arrows A in FIG. 4. Each rail is pivoted at its inner end 44 and connected by rams 45 to the arm 41, so that by operation of the rams the rails can be tilted about their pivots, and in particular can be so tilted as to raise the laterally outer edges of the panels as shown in outline in FIG. 4. The lower heat shield panels 46 below the strip path are also mounted through rollers 47a on rails 47, which in this instance are fixed, so as to be movable laterally inwards and outwards by rams 48 in the same manner as the upper panels.

The movements of the different rams during the operation of the arrangement to control the temperature of a steel strip traveling along the conveyor path is governed by a control unit 60 (FIG. 5) receiving signals from an array of temperature sensors 61 disposed across the width of the strip. It is unnecessary to illustrate the detailed construction of the unit 60, since the principles of control equipment design by which these signals are utilised to give the outputs indicated below are well understood and are fully within the knowledge of a person skilled in the art. If the sensors indicate that the temperature at the edges of the strip is too high, the rams 45 between the cantilever arms and the upper rails 42 can be operated to tilt the outer edges of the upper panels upwards, the angle being adjusted to suit the required heat loss rate. If, on the other hand, the temperature at the centre of the strip is too high the panels 40 and/or 46 can be traversed on their rails so as to leave a gap at the centre, both above and below the strip, to allow increased radiation from that region. The extent of the opening movement and the number of panels opened along the length of the conveyor path can be adjusted to suit the extent of the temperature correction required.

It is also possible to lift the cantilever arms 41, with the panels 40, this serving both as a means of temperature control for the strip and as a means of protection of the panels against damage from a bent or buckled strip. For this purpose, as may be more clearly seen from FIG. 4, each arm 41 is mounted on a fixed frame 50 through a normally horizontally shorter link 51 pivoted at 52 to the lower end of the arm and a longer link 53 pivoted at 54 intermediate the length of the arm and normally lying parallel to the cranked end portion of the arm. The arm 41 is displaced by a ram 55 attached at one end 56 to the frame 50 and its other end 57 being connected to the longer link 53. The mechanism operates, when the ram 55 is extended, to produce a magnified pivoting movement of the arm 41, as shown in FIG. 4, the stroke of the ram being set so that the panels can be raised to a nearly vertical position, leaving clear access to the roller table.

As already indicated, the ram 55 can be operated by the automatic control means to regulate the temperature of the material. This can be done when it is required to lower the temperature of the strip as a whole rather than alter the temperature distribution, and normally it will be sufficient for only a small length of the total length of the upper series of heat shields to be lifted away for this purpose. The number of panels so raised will determine the cooling effect obtained. The rams 55 may be automatically operated if a bent or buckled strip is in the mill. The bumper bars 14 provide initial protection in this eventuality, but they also can be provided with pressure-sensitive switches so that as the strip bears against them, the rams 46 are actuated and the upper panels are immediately raised clear of the strip, independently of whether they have actually been contacted by the deformed strip.

It will be understood that the control unit may comprise means for readily adjusting the set points or required temperature limits to suit different materials being processed and there may be a number of arrays of temperature sensors at different stations along the length of the strip conveyor path, either operating upon the same control unit or operating upon separate control units for individual stations of the conveyor path.

The invention is not restricted to installations in which the heated material is in strip form, and FIGS. 6 to 8 illustrate the application of the invention to control the temperature of bar or profiled section stock moving along a conveyor path.

Mounted on a fixed frame 71 are drive rollers 72 for the stock 73, shown here as a square section bar, driven by one or more motors 74. The conveyor path runs perpendicular to the plane of the figure. Mountings 76 pivotable about an axis 77 parallel to the conveyor path carry upwardly projecting side support rollers 78 for the stock and lower heat shield panels 80 of the composite construction already described. Together with upper U-form panels 81 of similar construction these lower panels 80 form a tubular enclosure for the stock. The upper panels 81 are supported on pivot mountings 82 that allow them to be swung upwards to the broken-line position by rams 83, clear of the conveyor and the stock on it. When the upper panels have been swung away in this manner, the side support rollers 78 can be pivoted downwards to give free access to the stock, in particular to allow bent or damaged stock to be removed more easily. The pivoting of the mountings 76 for the lower panels 80 allows them to be tilted when the installation is being serviced to shake off any accumulation of mill scale or other foreign matter.

Because the top panel has a cross-sectional profile that increases its stiffness as compared with the flat panels so far described, it can be made considerably longer: it may have flat faces 84 or axial corrugations 85 can be provided to stiffen the inner cover plate, as has already been described. This inner cover plate is allowed some freedom to expand axially and laterally and is retained in place by lipped edges 86 of the panel casing and heat-resistant ties 87 passing through the inner core of insulating material. A bumper bar 88 projects through the top panels to protect them from being damaged by out-of-shape material. As already described, the bar can be provided with impact sensors 89 arranged to trigger the operation of the lifting rams 83 for raising the top panels.

The cross-sectional profile of the panels can be varied, for example, to suit a particular cross-section profile material, as is exemplified in FIGS. 7 and 8. In FIG. 7, the bottom panel 91 also has a U-form profile increasing its stiffness and the radiussing of the cover plates at the inner corners 92 of the panels can improve the uniformity of the temperature of the stock passing through the arrangement. The corners of rectangular stock or even of the outer edges of the flanges of the I-section shown will normally radiate heat more freely and so cool faster, but the increased insulation of the radiussed corners of the panels has an opposite and therefore compensating effect. A similar effect can be obtained with the configuration shown in FIG. 8, where both panels 93 have a semi-circular cross-section.

Figure 9:
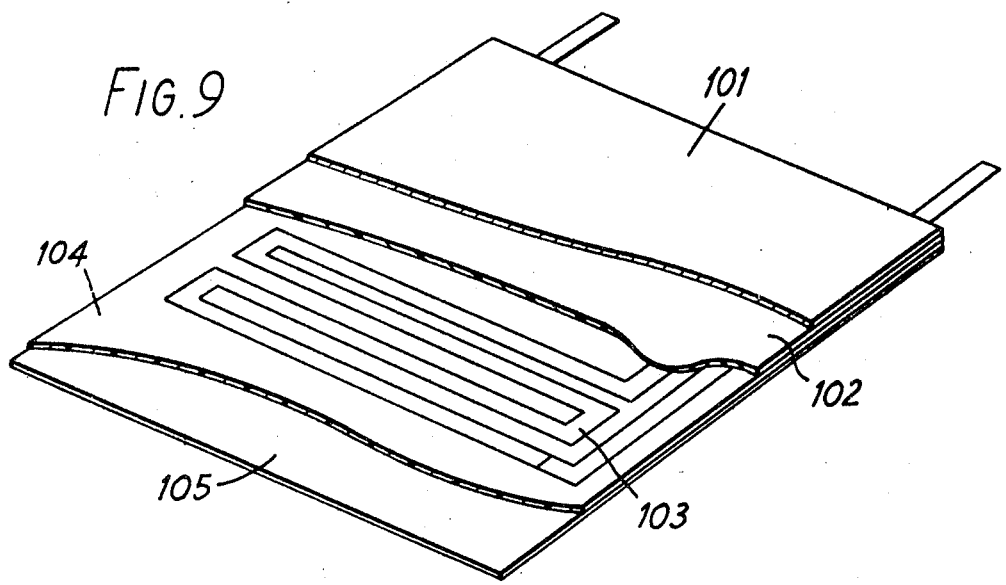
Figure 10:
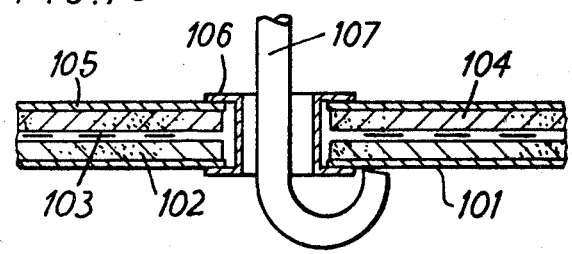

In some circumstances it may be required not only to conserve the heat in the material being processed but also to apply further heating. For example, this might be necessary if the material is to be held at a constant temperature. It is possible then to provide heating means in or on the insulation panels themselves, as is illustrated in FIGS. 9 and 10. These show a multi-layer cover plate, with a front plate 101 forming the hot face of the panel, a first electrically insulating layer 102, an electrical strip heating element 103 capable of operating at a temperature of 1100° C. or more, a second insulating layer 104, and a back plate 105 that like the front plate is suitable for use at high temperatures. The layers are secured together by hollow rivets 106 that may also serve to receive suspension ties 107 for the panel, although panels with cover plates of this construction are suitable for mounting both above and below the material being shielded. To maintain the material temperature, the element 103 may be of relatively low power, e.g. up to 5 kw/m2, but higher powers may be used when required. It will be clear without further illustration that the control unit 60 can also regulate the operation of the heating elements.

Figure 11:
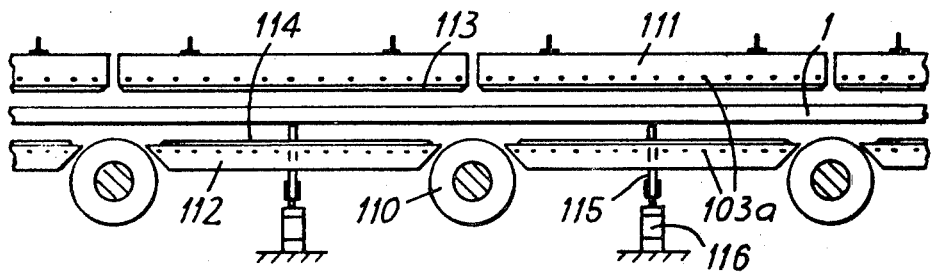
FIG. 11 is a longitudinal section of a heat shield arrangement illustrating a feature that can be employed in the arrangement of FIG. 2 or FIG. 4, FIGS. 12 and 13 illustrate in mutually transverse sections a modified roller construction that can also be employed in the arrangements of FIG. 2 or FIG. 4.

The use of panels with heating elements is shown in the arrangement in FIG. 11, although tubular sheathed elements 103a are illustrated. This example shows a further heat conservation measure, it being assumed in this example that the arrangement is being employed with an existing steel mill roller table, which will be equipped with large diameter rollers 110 of high thermal capacity, often water-cooled. The upper and lower thermal insulation panels 111, 112 have the general composite construction already described and both series of panels are arranged in pairs side-by-side, with a central skid bar, 113 and 114 respectively, between the panels of each pair. The lower panels are also so constructed that there are two or more successive panels along the distance between adjacent rollers 110, and between these successive panels transversely extending lifting bars 115 are interposed. These bars, of a high temperature alloy and possibly also provided with heat insulation, can be raised, e.g. by fluid pressure rams 116, to the position shown and so lift the material 1 from the rollers 110. The mechanism can be used when the operation of the mill requires the material on the roller table to be stopped for any significant length of time. Because of the thermal mass and/or the cooling of the rollers, there would be the risk that cold spots would develop in the material at the regions of contact with the rollers, and that these would affect the uniformity of the final product.

The problem of avoiding undue heat loss to the rollers can alternatively be overcome by modification of the roller table construction in the manner illustrated in FIGS. 12 and 13. The main supporting rollers 120 have smaller rollers 121 resting on them, the rollers 121 being of a heat insulating material. Both series of rollers are journalled in a housing assembly 122 and are driven together, as by the gearing 123. It may be arranged that the housing assembly can readily be opened to remove the rollers 121 at least, when servicing is needed. Upper heat-insulating panels 124 can be lifted clear in the manner already described when this is to be done.

The main rollers preferably have reduced diameter portions 125 so that the contact area between the rollers 120, 121 is confined to the relatively small extent of the larger diameter portions 126, so reducing any heat loss through conduction. If scale drops from the material on the table this measure also helps the scale to fall clear. It is a further advantage in the use of the smaller diameter high-temperature rollers that the lower heat-insulating panels 127 can be brought closer together, so that there is a further reduction of heat loss by radiation.

Reference has already been made to the provision of means for raising the upper panels of a heat shield arrangement to prevent damage by lifting of the heated material or due to the material being deformed in such a way that its effective height is increased. FIG. 14 illustrates an embodiment of a heat shield arrangement incorporating a further example of such means, in this instance in the form of a self-contained module that can be fitted into an existing rolling mill installation although its functional features are capable of wider application. The module comprises top, bottom and side panels 220, 222, 224 respectively supported on a rigid frame 226 having mounting flanges 228. Elongated slots 230 are formed in the side members 232 of the frame to allow clearance for the mill roller-table rollers (not shown). The bottom panels are mounted on cross-bracing sub-frames (not shown) which increase the stiffness of the frame 226.

Also mounted on the cross-bracing sub-frames are longitudinal bumper or fender bars 234 projecting above the bottom panels to protect them from damage by the hot strip. The bars also help to guide the leading edge of the strip from roller to roller, and when the arrangement is to form part of the original equipment of a rolling mill installation the guidance offered by the bumper bars allows the roller table to be designed with the rollers to be spaced more widely apart than has hitherto been the practice so that there is a corresponding increase of the heat-insulating panel area.

The side panels are protected by bumper or fender elements in the form of upwardly extending bolsters 236 fixed rigidly to the main frame 226. The spacing between the bolsters will be determined by the anticipated measure of sideways movement of the hot strip but generally two bolsters per side panel will be sufficient. In the design of the bolsters a compromise must be reached between mechanical strength and resistance to thermal stresses, as it will be appreciated that there will be larger thermal gradients within them. To minimise the generation of thermal stresses a series of slots or grooves 238 can be formed in the exposed or hot face of each bolster to allow the hot face to expand and contract relatively freely. Thermal stress relieving grooves (not shown) may simialrly be used in the hot faces of the bottom bumper bars and the further bumper bars 240 that are provided for the top panels.

Although supported through the rigid frame, the top panels 220 are mounted in a displaceable manner so that they can be lifted away from the roller table. As already mentioned this may be needed, for example, to prevent damage to the top panel if the hot strip lifts from the roller table but it is arranged that minor disturbances will not cause the top panels to lift and they are swung away from the roller table only if excessive upward forces occur on the bumper bars 240. Thus, it has been found that the front end of a hot steel strip can often bounce from roller to roller as it is feeding through the roller table, and it will then strike the bumper bars as it bounces, but not with any very great force. It is therefore an advantage to ensure that the heat shield arrangement remains undisturbed by these relatively minor disturbances, although protective action is needed if excessively large upward forces occur.

In the preferred arrangement shown, the top panel bumper bars 40 are mounted separately from the top panels 220 themselves, on a carrier frame 242 mounted on pivot blocks 44 on the main frame 226, the blocks defining a longitudinal pivot axis at the side of the roller table. Pairs of top panels are mounted each on a separate frame 46 that is also attached to the main frame and that surrounds the associated carrier frame 242. The panel mounting frames are pivoted on the same longitudinal axis as the carrier frames and are capable of relative rotation thereto to a limited extent.

In the closed or operative position of the top panels, as shown by the foremost pair in FIG. 14, each bumper bar carrier frame 242 is held down with a positive holding force by displacecment means in the form of fluid pressure rams 248 and bears on adjustable stops 249 mounted on that side of the frame 226 nearer the pivot axis. In the closed position the panel mounting frames are supported separately from the carrier frames, each panel mounting frame having a side flange 250 that can then rest upon the fixed frame 226.

The hold-down force exerted by the rams 248 on the carrier frames will be chosen in dependence upon the type of material being rolled, its temperature, width and thickness. The arrangement is such that if the strip strikes the bars 240 with a force less than the selected level their carrier frame 242 remains in position, but if a higher force is experienced the carrier frame will lift against the pre-loading force and activate a limit switch 251 to switch the pressure connections to the rams, so that the rams are extended and instead of holding down the bumper bars they lift the carrier frame 242. As the carrier frame rises it engages with brackets 252 the associated panel mounting frame and the mounting frame, with the panels mounted on it, are then lifted together with the carrier frame. To ensure positive entrainment of the panel mounting frame by the carrier frame in the downward closing movement, particularly if they are arranged to move to near to or past a vertical position, brackets 253 secured to each carrier frame overlap a portion of its associated panel mounting frame.

In the fully lowered position of each carrier frame a specific clearance is provided between the brackets 252 and the associated panel mounting frame by virtue of the independent support of the mounting frame on its side flange 250. In this way, while the carrier frame 242 remains in its lower position, the impact loads on its bumper bars are not transmitted to the panels or their mounting frame due to the independent support arrangements of the carrier and support frames. The bumper bars 240 therefore act as part of an independent cushioning system until a preset lifting force is experienced, so protecting the panels until the disturbing force is so great that it displaces the bumper bars sufficiently to raise both carrier and mounting frames, and with them the panels.

As an alternative or an addition to the limit switch already referred to for triggering movement of the bumper bar carrier frame, an inertia switch 251a may be attached to the frame to switch the rams when required. Since the inertia switch will respond in dependence upon the magnitude of the upwards force applied to the bumper bar, before the bar has been displaced significantly by the force, this can provide a more rapid response.

Incorporated herein by reference is our earlier application Ser. No. 91752 filed Nov. 6, 1979, from which the present application is a continuation-in-part, in which there is shown and described an example of a control circuit that may be employed to operate the rams in the manner already described.

Figure 15:
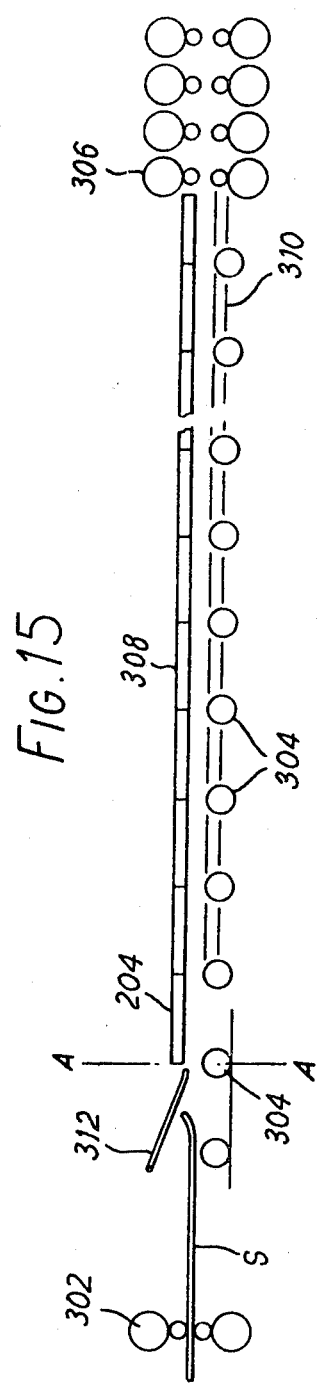
FIG. 15 is a schematic side view of another heat shield arrangement according to the invention between successive roll stands in a continuous rolling mill.
Figure 16:
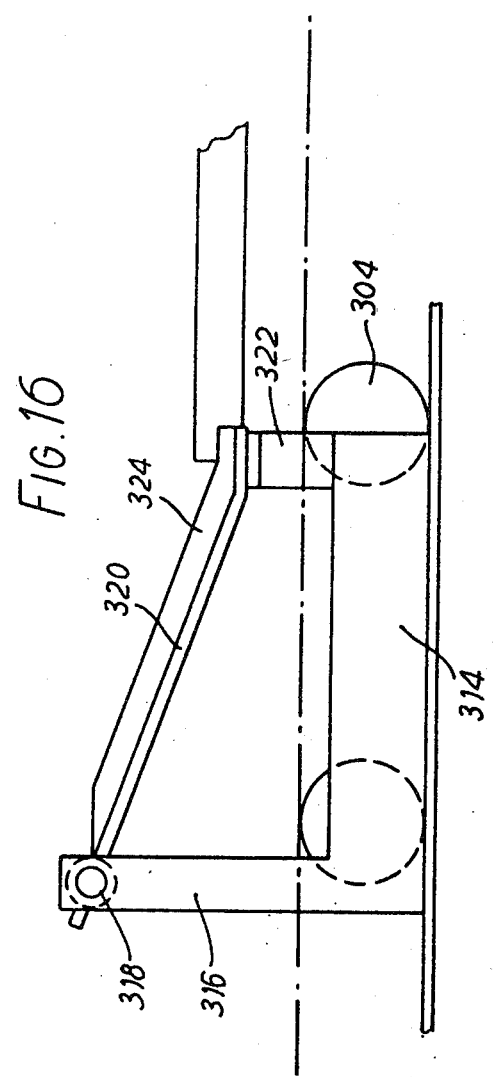
FIG. 16 shows to a larger scale a detail of the entry end of the heat shield arrangement of FIG. 15.

FIG. 14 shows the upper and lower panels at a uniform and relatively close vertical spacing, but this may not be possible at the entry region of the heat shield arrangement. FIG. 15 shows a section through a continuous rolling mill in which the material being rolled passes continuously through roughing stands 302, along the roller table 304 to the finishing stands 306. In this process it is not uncommon for the nose end of the slab or strip S to acquire a turn-up or set so that it is raised from the roller table to such an extent that it would not be able to enter the small spacing between the series of upper and lower panels 308,310. To overcome this problem and to ensure that quite large turn-ups can be accommodated, the arrangement has an entry region provided with guide means 312 that form an entry passage of increased height As FIG. 16 shows in more detail, the guide means comprise a robust base frame 314 that is clamped to the side walls of the existing roller table or is fixed rigidly to the mill foundations. Vertical members 316 of the frame support a transverse pivot bar 318 to which the leading end of a nose entry guide member 320 is attached. The guide member can thus pivot with the bar 318 but it normally rests upon adjustable bottom stops 322 at it rear end. The guide member takes the form of a reinforced frame or plate structure and includes a central spar 324 that extends under the main bumper bar of the first upper panel of the heat shield arrangement.

In use, the guide member will normally remain in its illustrated position under the combined action of its own weight and the hold-down force that is being applied to the bumper bar. The entering sheet material, if above the height of the bumper bar, will strike the guide member and be urged downwards to below the level of the bumper bar. If the turn-up or deformation of the entering material is such as to be able to force the entry guide member upwards, this will also displace its adjoining bumper bar and, as previously described, the panel raising mechanism will be operated. On the other hand, since the entry member can be of a very robust construction it is possible to arrange that it offers considerable resistance to displacement and thereby partially corrects any turn-up of the entry material.

Figure 19:
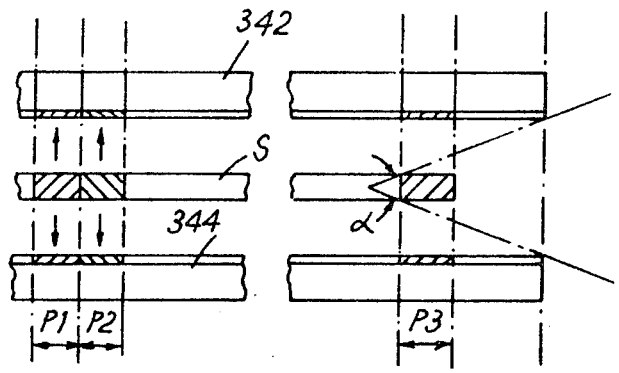
FIG. 19 is a schematic illustration to explain the manner in which different heat loss rates occur over the width of a hot strip.

In other types of rolling mill the above-described entry guide means may not be sufficient. For example, in semi-continuous mills the material is reduced from slab-form by consecutive passes backwards and forwards through reversing roughing stands. In this process there are considerably greater variations in turn-up or lift of the material than in a continuous rolling process and a much greater entry height must be permitted. In that case, to employ entry guide means with little or no heat-insulating effect, as shown in FIGS. 17 and 18, may make it difficult or impossible to provide an effective heat shield arrangement and an arrangement such as is illustrated in FIG. 19 may be required.

In this arrangement, an incresed height entry section 330 continues over part of the extent of the heat-insulating panels themselves, and this may occupy up to some 40% of the length of the roller table 304. The guide means 312 itself is generally similar to that already described with reference to FIG. 16, but is of course disposed at a higher level. As before it cooperates with the bumper bar associated with the leading upper panel 308a.

Where it is necessary to have a substantial vertical spacing between the upper and lower insulating panels, a further difficulty may arise, as will now be explained with reference to FIG. 19 which shows in schematic form a part of a transverse cross-section of a hot strip S as on a rolling mill delay table between mills, with heat shield panels 342, 344 above and below the strip respectively. In the central part of its width at portions such as P1 and P2 of the strip, most of the heat radiated from the hot strip will effectively go to heat up portions of corresponding width of the heat shield panels. Some fall of temeprature will result, to a similar extent for all such portions in the central region of the strip width.

At the edges of the strip, however, conditions are no longer uniform. Because a large proportion of the energy radiated from a marginal portion such as the edge width P3 will fall on parts of the heat shield panels which are beyond the width of the strip, this marginal portion of the strip gives up more heat to the panels so that there will be a greater fall in the temperature of the strip at its lateral margins.

This effect will be increased by heat loss to the sides between the top and bottom panels of the shield, where the energy radiated from the strip over an angle $\alpha$ will be directly lost. The direct radiation loss can be reduced by increasing the width of the shield relative to the strip, but then there is a greater energy loss from the hot strip to heat the marginal portions of the heat shield panels that will be particularly marked during start-up.

Figure 20:
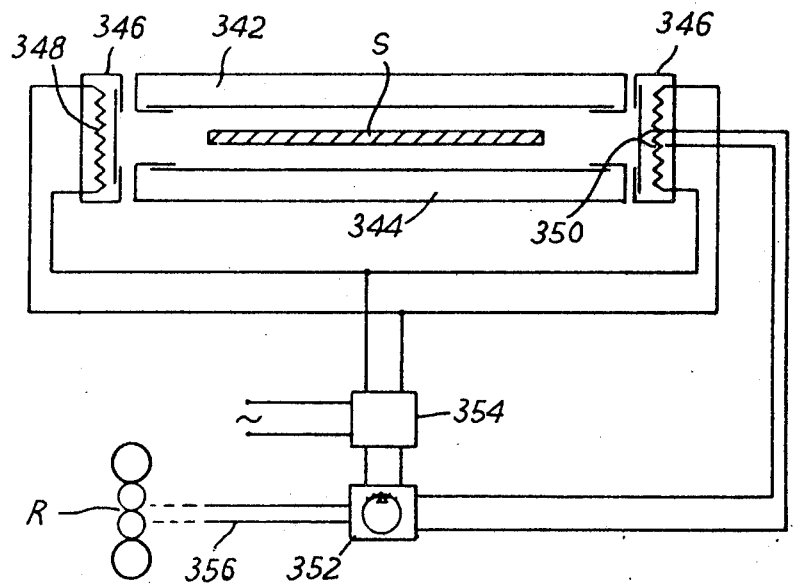
FIG. 20 is a diagrammatic sectional view of a heat shield arrangement having side insulating panels with heating means.

FIG. 20 illustrates one form of hot strip rolling mill arrangement according to the invention in which in addition to upper and lower heat-insulating panels 342, 344 heat-insualting side panels 346 are mounted at the outer edges of the upper and lower panels to form a heat shield surrounding the path of the hot strip S. It will be clear from the preceding explanation with reference to FIG. 19 that blocking off direct leakage of radiant energy from the edges of the strip in this manner will be advantageous under steady state conditions, but the side panels will themselves act as a heat sink when cold and the situation may only be improved slightly during start-up conditions.

To overcome this problem, the side panels are provided with heating means 348, which may be either contained within the panels, immediately behind an inner cover plate as illustrated, or be mounted over the inward face of the panels. In general it will be found that electrical heating elements provide the most convenient method of giving the flexibility of operation that is required, but other forms of heating such as radiant tube gas or oil burners can be used.

Although not shown in detail in the drawings, each of the heat-insulating panels may comprise a thin-walled casing containing a core of one or more layers of heat insulating material.

Temperature sensors 350 are located at convenient intervals along the length of the side panels 346 to monitor the inner surface temperature and the sensor signals are utilised by a controller 352 and voltage regulator 354 to provide a stepped power input to the heating elements of side panels for controlling the surface temperature.

In operation the apparatus may be controlled in the following manner. The desired side panel surface temperatures are first selected on the controller 352 and if the sensed values are below these temperatures the controller actuates the voltage regulator so that a controlled power supply is fed to the heating elements. Instead of relying on voltage regulation the control may operate by on/off switching of the heating elements. An interlock arrangement 356 prevents the heating of the side panels being switched on unless the finished stands R of the mill are ready for production. Once steady state conditions are reached and the control system switches off the side panel heaters, the panels of course continue to function as part of a passive heat shield arrangement. It will be understood that in particular installations it may be required to also have heating means associated with the upper and/or lower panels and these may then be operated in a similar manner.

It will be clear that the provision of such side heating means can be of particular advantage in the heat shield arrangement shown in FIG. 17, where there is a considerable distance between the upper and lower panels in the entry region of the roller table. As indicated by FIG. 18, therefore, the heating means as already described with reference to FIG. 20 can be employed over the increased height entry region. It will be understood that the use of such side heating means can be employed elsewhere in the heat shield arrangements, and may even be provided along the complete length of the heat shield arrangement if required.

Figure 21:
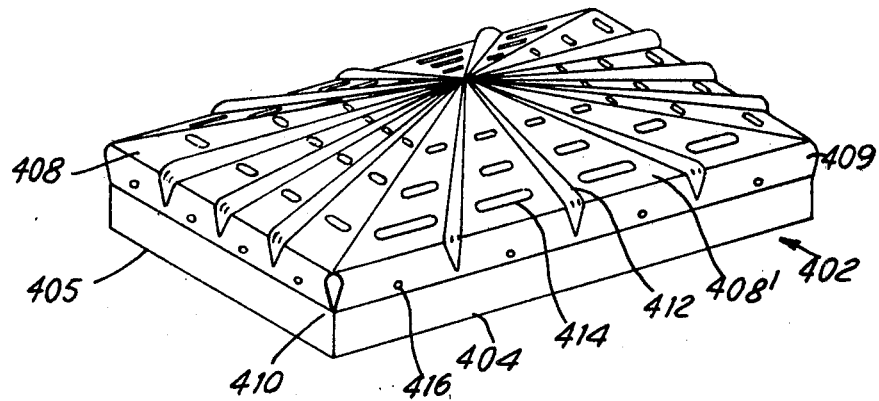
FIG. 21 illustrates another panel according to the invention having a convex hot face.
Figure 22A:
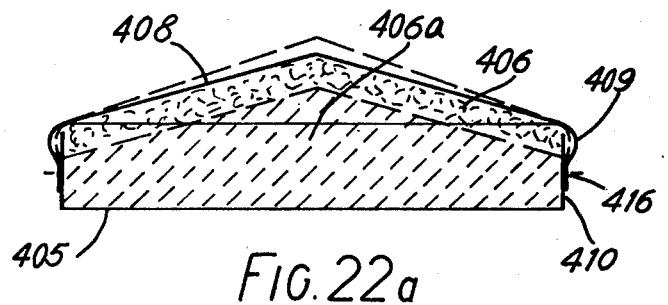
FIGS. 22a and 22b are schematic illustrations of the thermal deformation of the panel of FIG. 20 in operation.

FIGS. 21 and 22a and b show, for use in a slab hot rolling mill, a heat insulating panel 402 comprising a thin-walled casing 404 enclosing a ceramic fibre core 406 (only partly shown in FIGS. 22a and b). The casing comprises a base part 405 and a hot face formed by a thin wall or membrane 408 with extended side walls 409 fixed by fasteners 416 to side walls 410 of the base part 405 in the region towards the base or exterior of the casing which remains relatively cool in operation because the side walls are shielded from the hot slabs by adjacent similar panels. The hot face membrane is exposed directly to the heat of the metal slab being processed in the mill and is convex with its surfaces sloping to a central region where the height of the face is greatest (the terms convex and concave in the context of the present invention including a form made up of flat portions 408' such as the pyramidal-like form of the hot face illustrated in FIG. 21). As the membrane is heated by the passage of hot material over it, it expands to the position shown in broken lines and deforms in the manner illustrated in FIG. 22a, i.e. by increasing its convexity and bowing the side walls about the fixing points of the fasteners 416. Because of its thin-walled convex form, only relatively small internal stresses are generated by the deformation and local buckling can be minimised.

In this and all the following examples to be described herein, the internal ceramic fibre core 406, or at least a layer of that core adjacent the hot face membrane 408, is in the form of a precompressed blanket and with the expansion of the membrane 408 as illustrated in FIG. 22a it also expands resiliently to maintain contact with the membrane and so maintain the thermal insulating characteristics of the panel. Where the precompressed blanket provides only a layer of the ceramic fibre core immediately adjoining the hot face membrane, it is preferably backed by pre-formed ceramic fibre blocks 406a of ceramic fibre or lightweight refractory.

To further minimise internal stresses within the hot face membrane 408 from thermal expansion, FIG. 21 shows the provision of corrugations in that membrane. These comprise a series of radial corrugations 412 extending from the central peak of the membrane into the top portion of the margin of an adjoining side face but ending short of the fasteners 416 so that a "hinging" action can be obtained, and a secondary series of smaller corrugations 414 extending parallel to respective side faces between adjacent main corrugations. These corrugations are particularly useful with larger area panels, in order to allow for differential thermal expansion that may occur within the area of an individual panels.

Figure 22B:
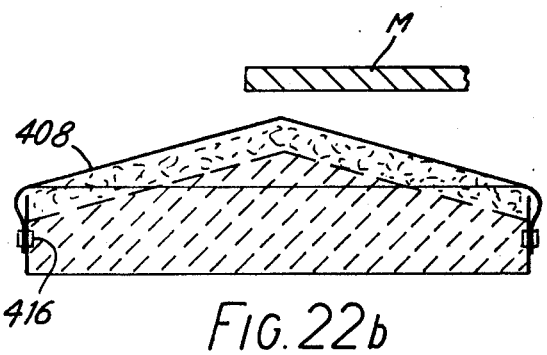

For example, as illustrated in FIG. 22b the hot material M being processed may be arrested in a position in which it covers only part of the area of a panel (or the panel may extend laterally beyond the width of the material) and the characteristic rapid heating will be experienced only by a part of the hot face membrane. The corrugations can then greatly reduce the internal thermal stresses produced by the resulting differential expansion of different portions of the membrane.

Figure 23:
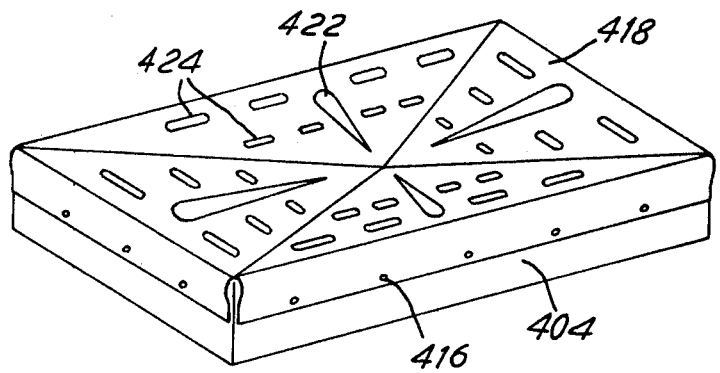
FIG. 23 illustrates a further panel according to the invention having a concave hot face.
Figure 24A:
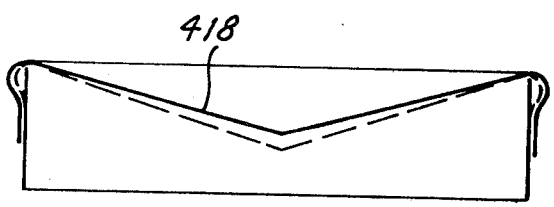
FIGS. 24a, 24b are schematic illustrations of the deformation of the panel of FIG. 23 in operation.
Figure 24B:
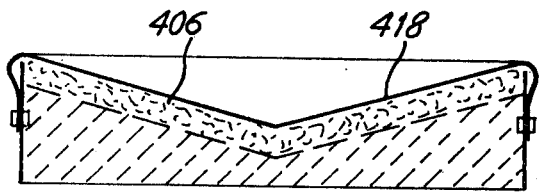

FIG. 23 illustrates an arrangement similar to that in FIG. 21 but one in which the hot face is formed by a concave membrane 418 that slopes downwardly from the side edges of the panel to a lower central region. The ceramic fibre core 406 is similarly resiliently packed into the panel casing and is compressed by the increasing concavity of the hot face membrane (indicated in broken lines in FIG. 24a) when that face is heated. The membrane 418 is also shown with main and auxiliary corrugations 422, 424, analogously to the example in FIG. 21. In this arrangement, however, the main corrugations 422 are at right angles to their respective adjacent edges of the hot face membrane, and they do not extend into the side walls. This arrangement is more suited for panels which are markedly oblong, whereas the arrangement in FIG. 21 is more suited to panels that are plate-like in plan view.

Either of the two examples of panels described above may be deployed above the material being processed, and the corrugations may then be either convex or concave. If deployed below the material being processed, there should be sufficient space between adjacent panels of the form shown in FIG. 21 to allow scale to escape, and preferably only convex corrugations should be used because concave corrugations could trap scale or other foreign matter and so impair the performance of the panel.

Figure 25:
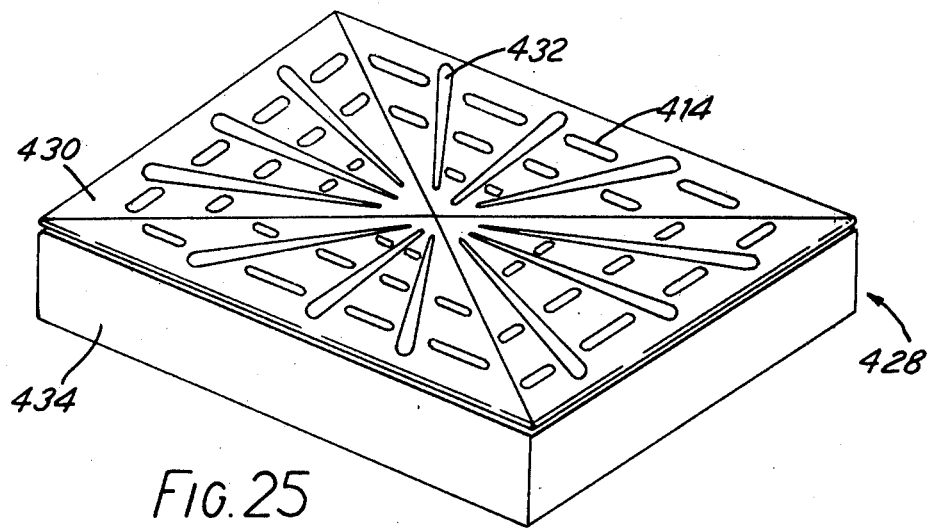
FIGS. 25 and 26 are isometric and sectional views of a preferred form of mounting for the hot face membrane of a panel according to the invention.
Figure 26A:
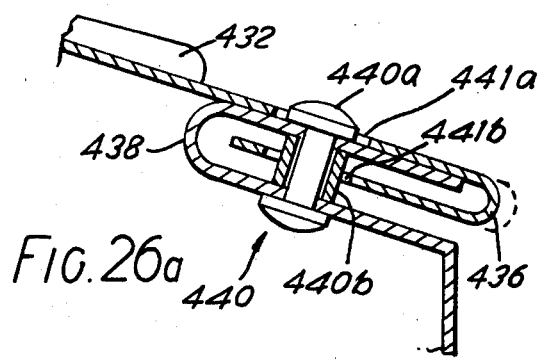
FIG. 26a is an enlarged illustration of a membrane edge joint shown in FIG. 26, FIGS. 27 and 28 are isometric and sectional views of another form of panel according to the invention.
Figure 26:
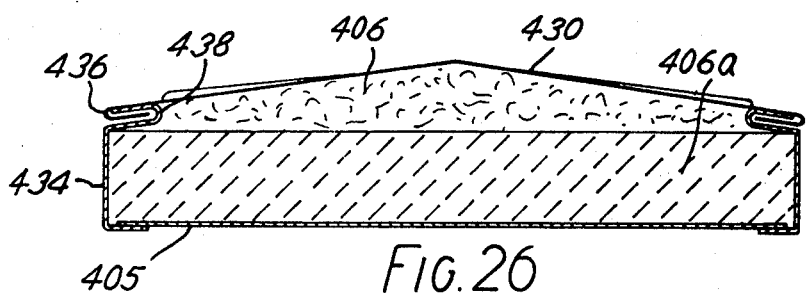

In certain cases, as when the panels are placed very close to the path of the hot material to optimise their thermal effectiveness, vertical deformations as indicated in FIG. 22a must be limited to avoid the risk of the material striking the membrane. It is, however, possible to so form and support the membrane that thermal expansion results in mainly lateral deformations and FIGS. 25, 26 and 26a illustrates a panel 428 in which this is done, the panel being otherwise similar to the preceding examples.

In this construction, a convex hot face membrane 430 is formed separately from the thicker side walls of the panel and the radial corrugations 432 terminate short of the sides of the panel. The membrane is fixed to the panel side walls 434 along its edges, each edge being folded along its length to form a U-section lip 436 having both limbs of the U-section substantially parallel to the adjacent region of the panel. The adjoining side walls each have a similarly folded edge forming an oppositely directed U-section lip 438 so that the two U-section lips 436,438 interlock.

The interlocking engagement allows sliding between the lips parallel to the limbs of the U-sections; the membrane 430 is therefore able to expand laterally and is not constrained to increase its convexity as it is heated. The spacing of the parallel limbs of the U-section lips is substantially greater than the thickness of that limb of the other lip held between them. Between the limbs of the casing side edge lip 438, a spacing of about 4 to 5 mm may be provided to receive the limb of a hot face membrane of 1.0 mm thickness. In this way, even though the thin membrane may distort during prolonged use with repreated heating and cooling cycles, the receiving space for the outer limb of its lip 436 remains sufficient to allow the edge of the membrane still to slide relatively freely in the lip 438. Pins or rivets 440 may be provided at intervals along the length of each side wall edge, if required to prevent the U-section limbs of the respective lips spreading apart during extended use. The head 440a and a bushed shank 440b of each pin are located in elongate slots 441a, 441b in the limbs of the U-section membrane lips 436 so as not to restrict the expansion of the membrane, but they do ensure that the lips 436,438 will not slide out of engagement with each other.

Figure 27:
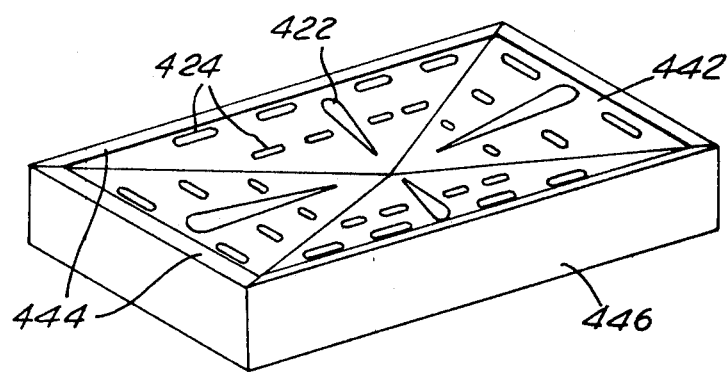
Figure 28:
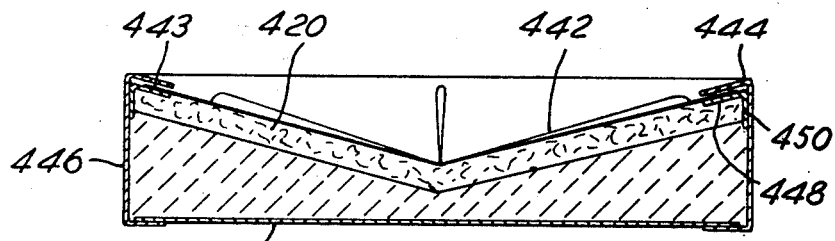

Analogously to the convex membrane panel in this last-described example, FIGS. 27 and 28 show a concave membrane panel in which the membrane 442 is retained behind flanges 444 of side walls 446 of the panel so as to be free to expand laterally when heated. In this example, the membrane edges 443 are not folded over but are retained in the channel provided by the upper folded-in flange 444 on each side wall and a lower flange 448 of a supplementary angle section 450 secured to the interior of each side wall. As in the preceding example, the spacing between the flanges 444, 448 is substantially greater than the thickness of the membrane 442, and pins can be inserted through the flanges and the interlocked edges of the membrane, like the pins 440 shown in FIG. 26a to ensure that the parts of the joints are maintained in their correct working relationship. It will be understood that a concave panel can alternatively have the interlocking U-section joints of the preceding example, and indeed that a convex membrane can be held behind flanged side walls in the manner shown in FIGS. 27 and 28.

Figure 29:
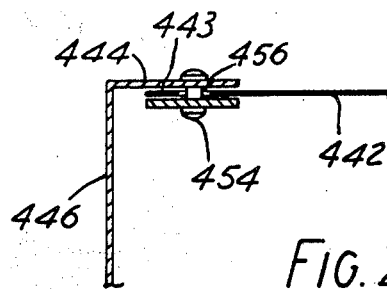
FIG. 29 is a schematic detail view of an alternative membrane edge joint.

FIG. 29 illustrates an alternative way of attaching the hot face membrane 442 to flanged side walls 446 of a panel in which rivets 454 or the like hold the membrane between the flange 444 and a free backing member, the apertures 456 in the membrane edge 443 for the rivets being elongated to allow thermal expansion movements.

Figure 30:
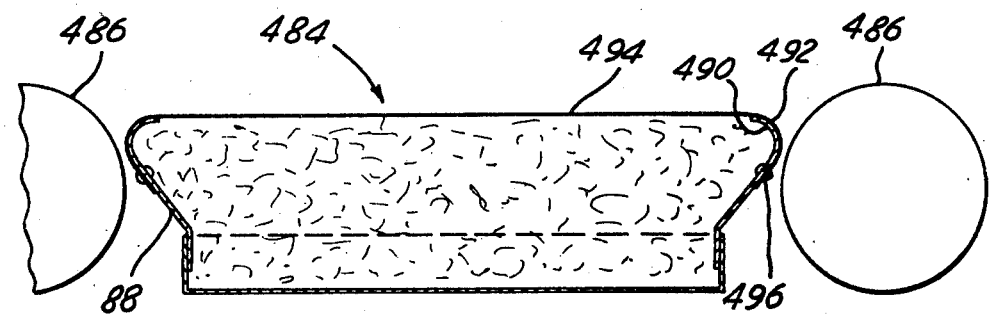
FIGS. 30 and 31 are mutually transverse sectional views showing further details of another form of panel according to the invention.
Figure 31:
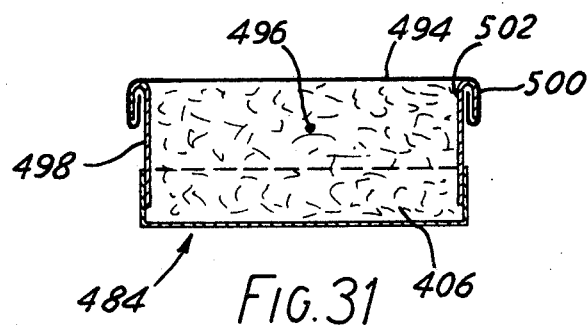

Another alternative way of securing the hot face membrane in a panel according to the invention is illustrated in FIGS. 30 and 31 for a panel that is to be disposed below the material being processed. This shows a panel 484 between two adjacent rolls 486 of a roller table and side walls 488 at the front and rear of the panel have curved top edges 490 that are lapped by the side margins 492 of the hot face membrane 494. Near their bottom edges these side margins are secured to the side walls, e.g. by riveting or welding, the securing means 496 being confined to the centre of the panel. The curved regions of the overlapping side walls and membrane side edges can allow some resiliently flexible deformation transverse to the roll axes.

Along the side walls 498 running transverse to the roll axes, the joints between the side walls and the top membrane are formed by interlocking U-section lips 500, 502 of the membrane and side walls respectively. The limbs of the lips are directed transversely to the plane of the hot face membrane but in normal use there is free space between adjacent limbs, even greater than the nominal spacing provided in the examples of FIGS. 26 and 28, whereby relative thermal expansion movements are not hindered by these joints. Since the membrane is positively located relative to the side walls by the rivets or welds 496 on the fore and aft centreline of the panel, and by curved top edges 490,492, these interlocking U-section lips need not have any supporting function and can act simply to prevent foreign matter such as scale and water (for example from mill descaling equipment) entering the panels and damaging the refractory linings.

It is to be understood that although the preceding examples show panels with convex or concave hot face membranes having edges located in engagements provided by the adjacent sides of the panel casings that allow said edges to move substantially freely laterally of said engagements, it is also possible to provide such engagements for planar hot face membranes to similarly permit relative thermal expansion to occur.

In these examples in which the edges of the membrane are retained by casing elements so that they are permitted a limited movement, at most, both inwardly and outwardly relative to the plane of the hot face, the ceramic fibre core is preferably precompressed, as described above, and so generally bears against the membrane urging it outwards. However because the membrane also has its inwards movements limited by said casing elements, independently of the ceramic fibre packing, any deformations that may occur during use, or local shifts in the position of the ceramic fibre will have little deleterious effect on the functioning of the hot face membrane and the useful life of the panel is therefore prolonged.

Figure 32:
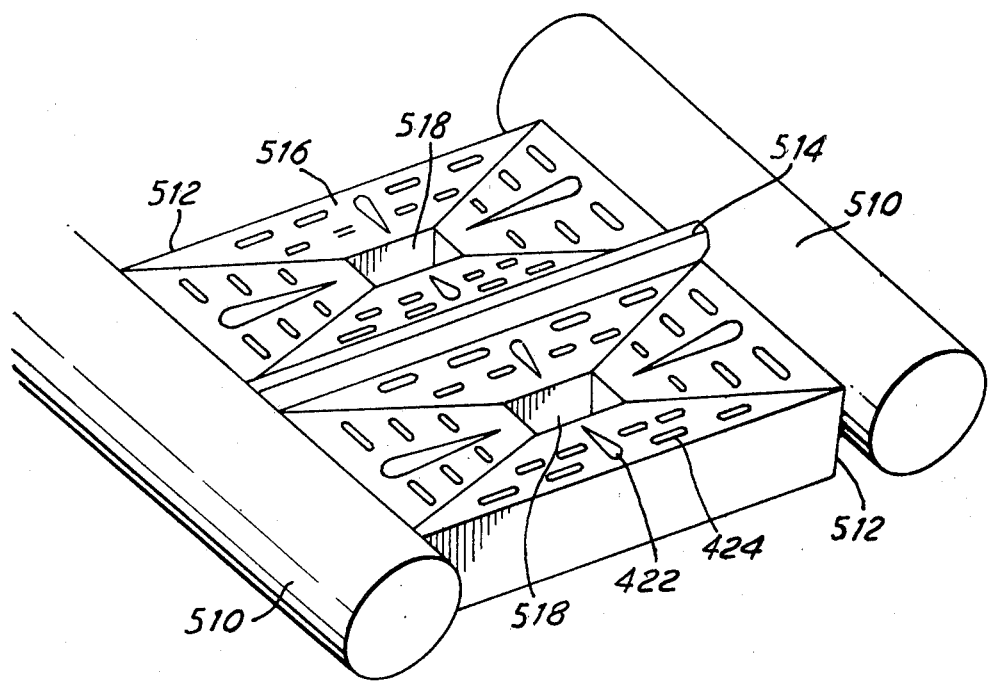
FIG. 32 illustrates a pair of bottom panels according to another embodiment of the invention.
Figure 33:
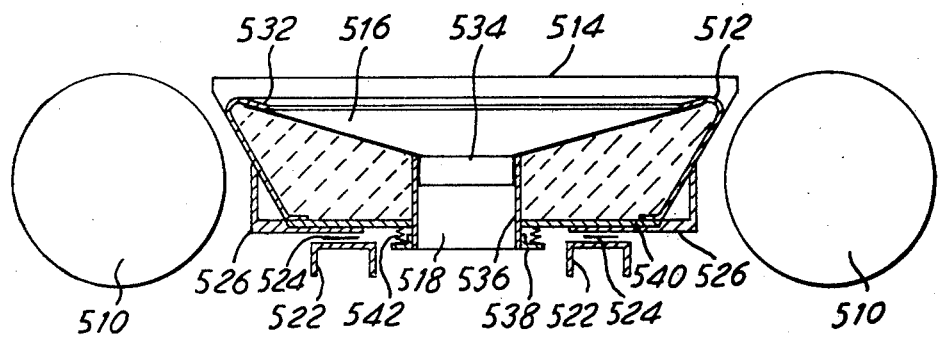
FIG. 33 is a longitudinal section in a central vertical plane of one of the panels in FIG. 32.

With some modification, a panel having a concave hot face membrane can be particularly suitable for a bottom panel to be disposed below the material being processed and FIGS. 32 and 33 show one example of panels adapted to that purpose. Between successive rollers 510 on a flat product roller transfer table there are two bottom panels 512 arranged side by side and separated by the central transfer bar 514 which prevents the material being processed from striking and damaging the panels. The hot face membrane 516 of each panel is concave, with its surfaces sloping towards a central discharge opening 518 that extends through the panel. Preferably the discharge opening is of rectangular section and has a minimum width of not less than 30 mm. Scale falling on the panels is therefore able to slide down the top face membrane and be discharged continuously through the opening so that only a minimal deposit will be present at any time. The top face membrane is provided with convex corrugations or ribs 422,424 as shown in FIG. 27. The panels are mounted on fixed supports 522 through springs 524 and brackets 526 so that they will be vibrated continually by surrounding disturbances, in particular by the movement of the hot material along the mill roller table, this assisting the movement of the scale to the discharge opening. Additionally or alternatively a vibratory actuator can be employed (as exemplified by the mechanism 570 in FIG. 35).

The concave form of the hot face membrane is particularly suitable for the bottom panels because as is shown in FIG. 33 it allows the panels to extend, in their regions adjacent the table rollers 510, close to the upper limits of the rollers and so shield the rollers as much as possible from the heat of the material being processed.

While it is possible to locate the hot face membrane so that its edges can move relative to the adjoining sides of the panel casing, in the manner already described above, FIG. 33 illustrates instead a means for applying tension to the concave membrane 516 in order to assist it to retain its shape as it undergoes repeated thermal cycles. The outer periphery of the membrane is fixed to folded-over lips 532 of the side walls, and at the central opening it has a folded over lip 534 that is fixed, as by bolts, rivets or welds, to a thicker section chute 536 which has a bottom flange 538 spaced below the bottom wall 540 of the panel. Compression springs 542 between the bottom flange and the bottom wall, or similar tensioning means, apply a downwards force to the chute that is in turn transmitted to the top face membrane.

The hot face membrane has a slope that is preferably at least 18° to the horizontal to ensure the movement of the scale to the chute. Larger angles can be used, but because a minimum thickness of panel is necessary to obtain the required heat-shielding properties, too great a slope will increase the overall depth of the panel excessively. In practical terms, when the panels are to be retrofitted to existing rolling mill roller tables, the limited space available may make it impossible to have an angle greater than 32° if each panel has only a central scale chute.

It is possible to increase the slope angle without unduly increasing the overall depth if the panel has a number of spaced scale chutes over its area, but this complicates the contruction and also reduces the effective heat shield surface area. Nevertheless if it is required to have relatively large panels and the operating conditions are not unduly severe it may be preferred to employ an arrangement with two or more scale chutes within the area of an individual panel.

Figure 34:
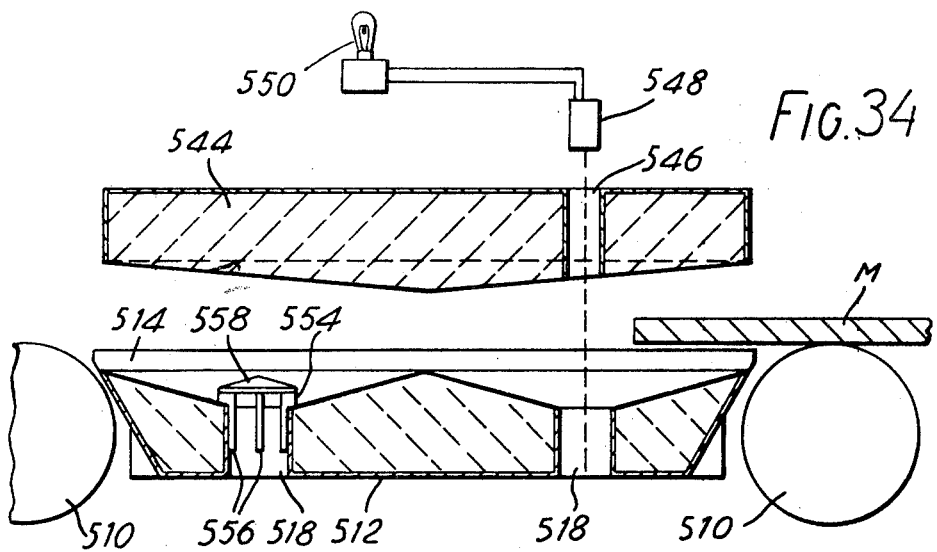
FIG. 34 is a further longitudinal vertical section illustrating some modifications of the panels described with respect to FIGS. 32 and 33.

The openings 518 may serve a further function, as will now be described with reference to FIG. 34. The discarded scale falling through the chute will fall into a water flume or channel (not shown) conventionally provided in a slab rolling mill and be carried away by the flow of water there. If in the adjacent upper panel 544 there is an aperture 546 aligned with the opening, it is possible to mount a hot metal detector 548 above the upper panel having a line of sight into the water flume. The detector will then sense the arrival of a hot slab below it as the slab obscures the line of sight into the cold flume. The operation of the detector may thus be used to actuate indicating means, e.g. the indicating lamp 550, to signal the arrival of the slab M.

By arranging a series of detectors along the material path, up to a maximum dictated by the number of scale chutes, and connecting them each to an individual indicating means with repeater signals elsewhere if required, it is possible to provide a continuous indication of the slab position, e.g. as an analogous display of indicating lamps. This may be particularly desirable in a tunnel installation in which the slab is totally enclosed by the arrangement of heat-shielding panels and its progress cannot therefore be observed directly.

If a scale chute is not utilised for indicating means as described above, it is possible to reduce the heat loss through it by the use of a shielding cowl 554 having stepped lugs 556 that fit slidably within the chute to support top hood 558 of the cowl at a position spaced above the adjacent hot face surfaces so as not to obstruct the passage of scale into the chute. The hood of the cowl can, like the panel, be a thin-walled construction with internal ceramic fibre insulation.

The scale disposal arrangements have been described in the preceding embodiments with particular reference to their application to hot strip mill applications, where water flumes or channels exist to carry scale away to recovery points. Panels according to the invention can also be used for retaining heat in bars and slabs in other processes, for example during heat treatment or annealing operations, and alternative panel arrangements and scale removal means may then be preferred.

Figure 35:
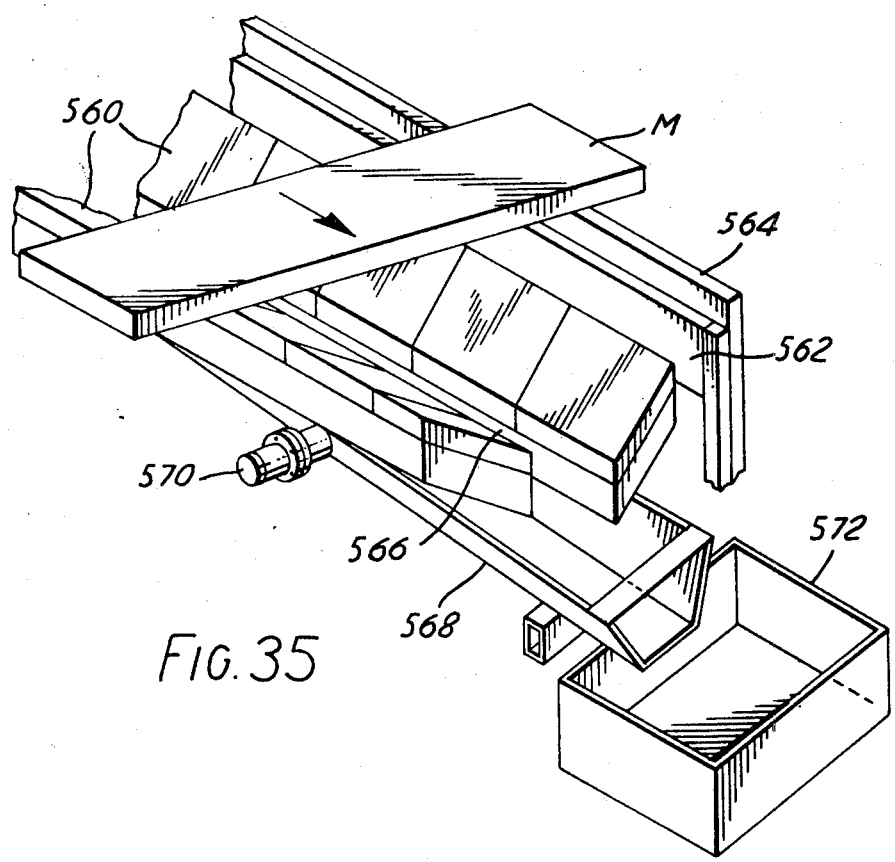
FIG. 35 illustrates a group of bottom panels according to a further embodiment of the invention.

FIG. 35 shows an arrangement for an annealing furnace in which the hot slab or bar M is traversed in the direction of the arrow shown through an installation of upper and lower panels having the membrane-covered insulated core construction already described, (only the lower panels 560 being illustrated in outline) by a known form of moving beam mechanism comprising a series of fixed beams 562 and displaceable carrier beams 564 (only one of each of which is illustrated) at spaced intervals along the length of the material. The carrier beams are movable both vertically and transversely to their length to lift the material from the fixed beams and displace it in a stepwise manner along its path through the furnace.

Between each pair of fixed and carrier beams is a group of the lower panels 560 sloped to form a continuous scale chute 566 so that scale falling from the hot product will be directed into one or more troughs 568 disposed below the chute. The trough(s) are inclined from the horizontal and are fitted with vibrator mechanisms 570 similarly to the vibratory drives that are referred to above for vibrating the roller mill table panels. The mechanisms 570 are operated intermittently to ensure that any accumulated scale is discharged into a collecting bin 572.

The facility with which the fallen scale can be collected, even in relatively small quantities, in this and the earlier described embodiments, is particularly suitable for the handling of high alloy products, where the scale will be of a known composition with a large alloy content, and therefore has a substantial scrap value.

What is claimed is:

1. A composite thermal insulation panel for a metal processing installation and comprising, in combination, a core of heat-insulating material providing a heat-insulating layer, a protective casing enclosing said core, said casing having a main face to be exposed to thermal radiation from adjacent high temperature material, a thin-walled cover plate providing said main face of the casing and forming a membrane adapted to form a hot face of the panel with a temperature close to that of said material, at least one pair of sides of the panel casing having retaining elements for the membrane, said elements being arranged as pairs of opposed elements with a spacing between them, edges of the membrane each being held between said pairs of a opposed elements of the panel casing and the spacing between said opposed elements of each pair being substantially larger that the thickness of the membrane, and said membrane edges being movable inwardly and outwardly substantially freely relative to said elements while remaining engaged therebetween.

2. A panel according to claim 1 wherein the insulating core comprises ceramic fibre material and said cover plate is held at its edges to compress said material and urge it resiliently into contact with the membrane.

3. A panel according to claim 1 wherein at said retained edges of the membrane, at least one group of the respective groups of membrane edges and of retaining elements at the sides of the panel casing have a U-section formation providing a channel-form engagement.

4. A panel according to claim 3 wherein said membrane edges and their retaining elements are both provided by lips of U-section formation extending substantially parallel to the hot face membrane.

5. A panel according to claim 3 wherein said U-section formations extend transversely to the hot face membrane and the interengaged surfaces are spaced from each other and transversely of the panel to permit relative thermal expansion transversely to their planar extent.

6. A panel according to claim 4 wherein holding means are provided to hold the interengaged U-section formations in interengagement while permitting sliding movements therebetween.

7. A panel according to claim 3 wherein the panel has side walls and inwardly turned flanges thereon form a receiving channel for edges of the hot face diaphragm to engage said diaphragm in place while permitting thermal expansion movements relative to the side walls.

8. A panel according to claim 7 having an oblong hot face with one pair of longer sides and one pair of shorter sides, and wherein said U-section formations are provided along the longer sides, while along the shorter sides the panel has walls with curved, inwardly directed edges and the hot face membrane has correspondingly curved edge portions that overlie said side face edges and securing means between said edges and edge portions are spaced from the hot face.

9. At least one composite thermal insulation panel for use in a metal processing installation, said at least one panel having a core of heat-insulating material enclosed in an outer casing comprising a thin wall providing a membrane adapted to be exposed to thermal radiation from adjacent high temperature material and to form a hot face of the panel with a temperature close to that of said material, said membrane of the or each said panel comprising a surface that is inclined downwardly to at least one aperture within the overall planar extent of said at least one panel.

10. A panel according to claim 9 wherein means are provided below said aperture for receiving particulate material falling therethrough.

11. A panel according to claim 9 provided with means for causing or permitting vibration of the panel to assist the movement of particulate material on the hot face towards said aperture.

12. A panel according to claim 9 wherein shielding means are provided to reduce heat loss through the aperture.

13. A panel according to claim 9 wherein temperature sensing means are provided at the side remote from the hot face membrane to be exposed to thermal radiation passing through said aperture from the side of the hot face.

14. A group of panels according to claim 13 comprising at least one upper panel and at least one lower panel arranged to be disposed above and below the high temperature material path respectively and having aligned apertures whereby temperature sensing means above the upper panel can respond to the temperature zone below the bottom panel when said path is clear.

15. A group of panels according to claim 9 wherein the individual panels coverage downwardly in the configuration of a gravity conveying device to direct particulate matter to a space between them.

16. A panel according to claim 9 wherein a series of inclined surfaces slope downwardly from the periphery of the hot face to an aperture in a central region of the hot face.

17. A composite thermal insulation panel for a metal processing installation and comprising, in combination, a core of heat-insulating material, a protective casing enclosing said core, said casing having a main face, a thin-walled cover plate providing said main face of the casing and forming a membrane adapted to be exposed to thermal radiation from adjacent high temperature material and to form a hot face of the panel with a temperature close to that of said material and to be relatively displaceable to the remainder of the casing to accommodate thermal expansion of said hot face, said membrane comprising surfaces that are inclined from at least two opposite edges to an inner region of the hot face which is thereby at a different level from said edges.

18. A panel according to claim 17 wherein said membrane has a generally pyramidal form.

19. A panel according to claim 17 wherein said membrane is provided with corrugations extending parallel to the base or edges of said pyramidal form.

20. A panel according to claim 17 wherein said membrane is arranged to extend generally horizontally and said surfaces are inclined downwardly towards an inner region of the panel.

21. A panel according to claim 20 wherein a through-opening is provided in said inner region whereby with the hot face of the panel uppermost, loose material falling on said surfaces is guided to fall through said opening.

22. A panel according to claim 17 wherein side extensions of said membrane project transversely away from the hot face and secure the membrane to adjoining parts of the casing.

23. A panel according to claim 17 wherein edges of said membrane of the hot face are slidably interengaged with the edges of peripheral side walls of the panel, at least one of said edges of the membrane and of the side walls having a U-section formation providing an engaging channel for the adjoining region of the other of said edges.

24. A panel according to claim 17 having curved, inwardly directed edges at side walls thereof and wherein said hot face membrane has correspondingly curved edge portions that overlie said side wall edges and means spaced from the hot face secure said edge portions to said side wall edges.

25. A composite thermal insulation panel comprising, in combination, a core of fibrous ceramic material providing a heat-insulating layer a protective casing enclosing said core, said casing comprising a cover plate providing a thin-walled membrane adapted to act as the hot face of the panel and to radiate back heat received from a hot surface adjacent said face of the panel the casing further comprising wall portions in overlap with said cover plate, connection means between said wall portions and the cover plate retaining the cover plate in position and compressing said heat insulating layer against said membrane, the arrangement being such that the temperature of the membrane can be brought close to that of the hot surface and the connection means retaining the cover plate in position to permit relative thermal expansion of the membrane with respect to said wall portions of the casing.

26. A panel according to claim 25 wherein the cover plate has at least a part of its area provided with locally contoured formations.

27. A panel according to claim 26 wherein said formations comprise a series of parallel corrugations and the panel is of elongate form with the corrugations extending transversely to its length.

28. A panel according to claim 25 wherein the casing has a main face opposite to said cover plate main face and formed by a further plate, means being provided for permitting thermal expansion of said further plate with respect to the adjoining regions of the casing.

29. A panel according to claim 25 wherein a substantially dust-tight enclosure for the core is provided by the casing, or by the casing and cover layer jointly, and vents open to the exterior from the interior of the casing, non-return closure means for said vents preventing or limiting a return flow therethrough into the casing.

30. A panel according to claim 25 wherein supporting elements for the cover plate extend through the core of the panel to engage said plate.

31. A panel according to claim 25 wherein side faces of the panel adjoin the cover plate and an integral welded construction is formed with said cover plate and side faces.

32. A panel according to claim 25 wherein the casing comprises a peripheral support frame against which the cover plate freely rests to permit relative thermal expansion between the cover plate and the casing.

33. A panel according to claim 32 wherein resilient means urge the cover plate against said support frame.

34. A panel according to claim 25 further comprising heating means disposed immediately adjacent said hot face.

35. A panel according to claim 25 having an arched or channel transverse cross-section.

36. A heat-insulated tubular conduit formed by a plurality of composite thermal insulation panels having edge regions in juxtaposition to each other, each panel comprising a core of fibrous ceramic material providing a heat-insulating layer, a protective casing enclosing said core, said casing having a thin-walled cover plate forming a hot face of the panel and to radiate back heat received from a hot surface adjacent said face of the panel, the arrangement being such that the temperature of the cover plate can be brought close to that of the hot surface, means retaining the cover plate in position permitting relative thermal expansion of the cover plate said hot face with respect to the adjoining regions of the casing, and means projecting inwardly of said panels into the tubular conduit space for protection of said cover plates against damage by impact from material within said space.

* * * * *